US008199166B2

(12) United States Patent
Repin et al.

(10) Patent No.: US 8,199,166 B2
(45) Date of Patent: Jun. 12, 2012

(54) VISUALIZATION TECHNIQUES FOR OILFIELD OPERATIONS

(75) Inventors: Dmitriy Repin, Katy, TX (US); Vivek Singh, Houston, TX (US); Christos Nikolakis-Mouchas, Houston, TX (US); Farid Harhad, Baton Rouge, LA (US); Syed Hammad Zafar, Calgary (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 605 days.

(21) Appl. No.: 12/371,039

(22) Filed: Feb. 13, 2009

(65) Prior Publication Data

US 2009/0229819 A1 Sep. 17, 2009

Related U.S. Application Data

(60) Provisional application No. 61/036,875, filed on Mar. 14, 2008.

(51) Int. Cl.
*G09G 5/00* (2006.01)
(52) U.S. Cl. ...................................... 345/633
(58) Field of Classification Search .................. 345/632, 345/633; 702/9
See application file for complete search history.

(56) References Cited

U.S. PATENT DOCUMENTS

| 5,237,539 | A | 8/1993 | Selman |
| 6,115,025 | A * | 9/2000 | Buxton et al. ................. 345/659 |
| 6,690,393 | B2 * | 2/2004 | Heron et al. .................. 715/757 |
| 6,801,197 | B2 | 10/2004 | Sanstrom |
| 2002/0054129 | A1 * | 5/2002 | Heron et al. .................. 345/782 |
| 2006/0061595 | A1 | 3/2006 | Goede et al. |
| 2006/0161406 | A1 | 7/2006 | Kelfoun |
| 2007/0035511 | A1 | 2/2007 | Banerjee et al. |
| 2007/0153004 | A1 | 7/2007 | Airey et al. |
| 2007/0198499 | A1 | 8/2007 | Ritchford et al. |
| 2008/0052054 | A1 | 2/2008 | Beverina et al. |

OTHER PUBLICATIONS

Written opinion mailed on Apr. 22, 2009 in PCT/US09/34165, 6 pages.*
Autodesk, "User's Guide," Autodesk Design Review 2008, Feb. 2007.
Schlumberger, "InterACT Fundamentally changing business," Pamphlet, Aug. 2005.

* cited by examiner

*Primary Examiner* — Jeffery A Brier
(74) *Attorney, Agent, or Firm* — Colin L. Wier

(57) ABSTRACT

A method for visualizing oilfield data of an oilfield operation involves obtaining real-time data generated from a borehole, generating and updating a current position object, and displaying and annotating a representation of a first geology, geophysics, drilling, and production object in a display based on the oilfield data using a two dimensional (2D) callout having an attachment handle for adjusting the 2D callout according the updated location in an animation sequence in real-time responsive to updating the current position.

15 Claims, 16 Drawing Sheets

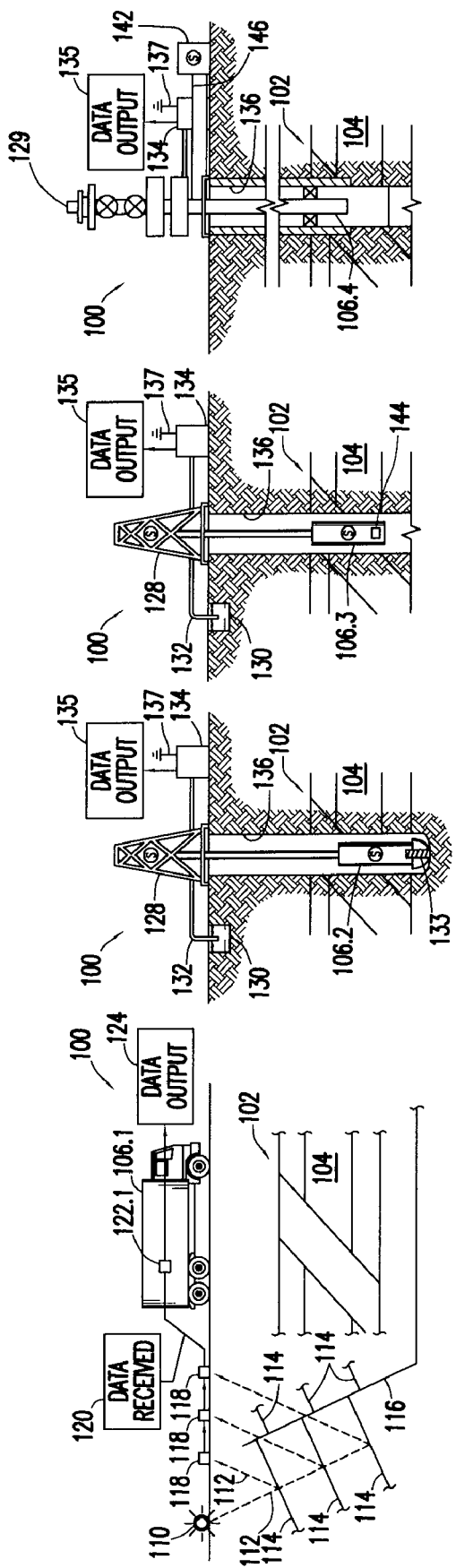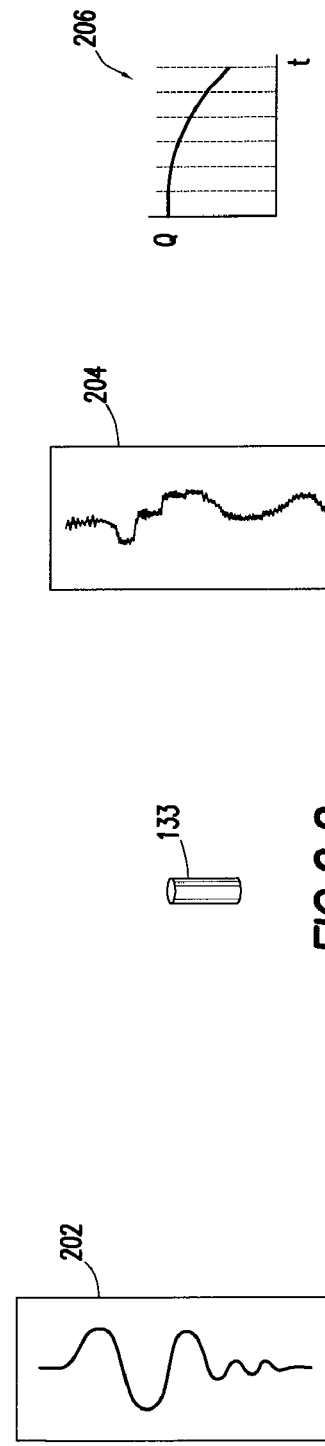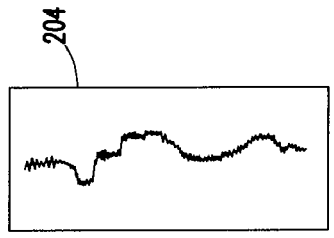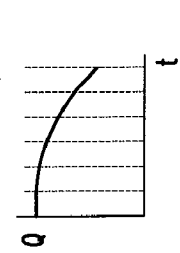

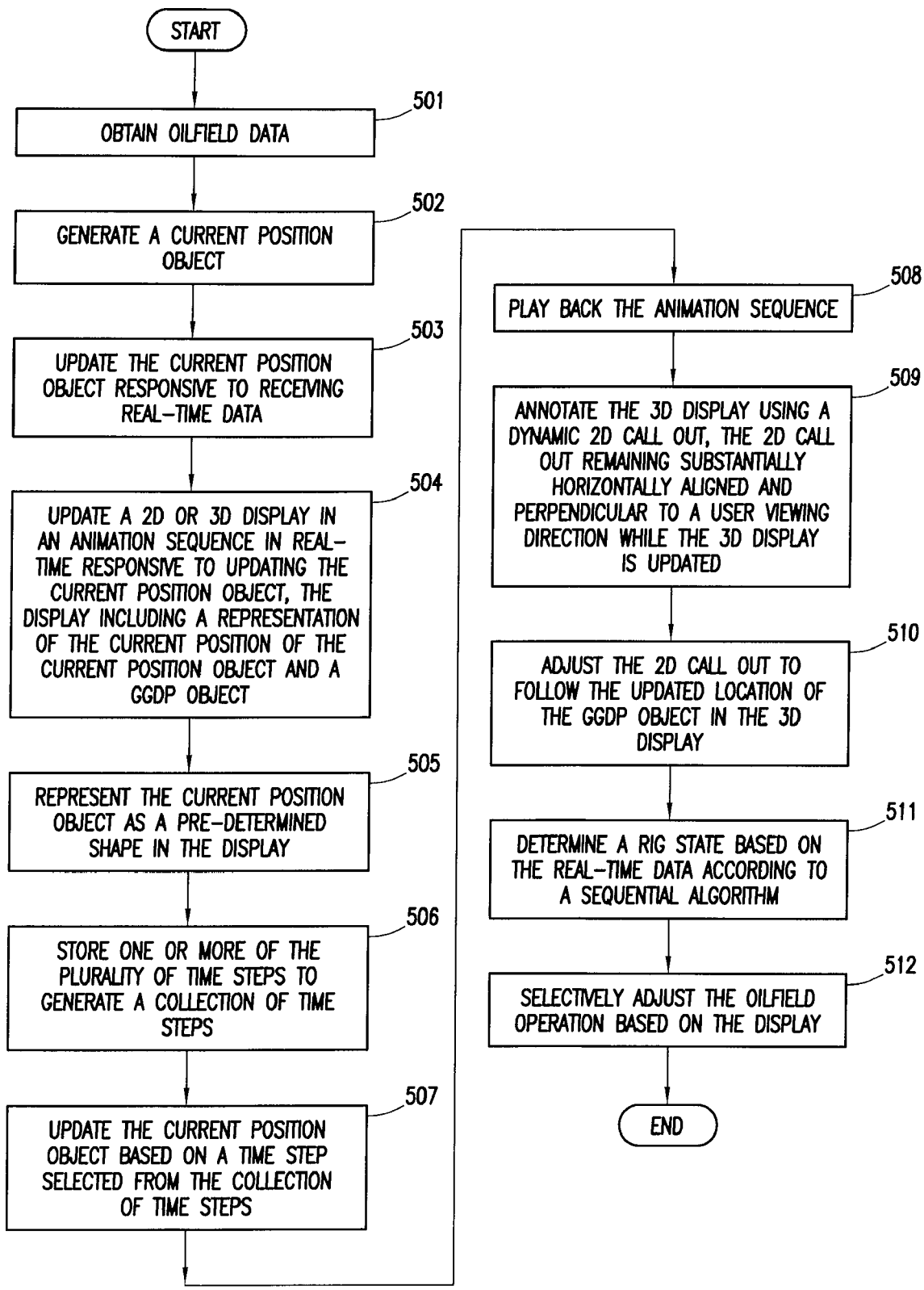
FIG.5.1

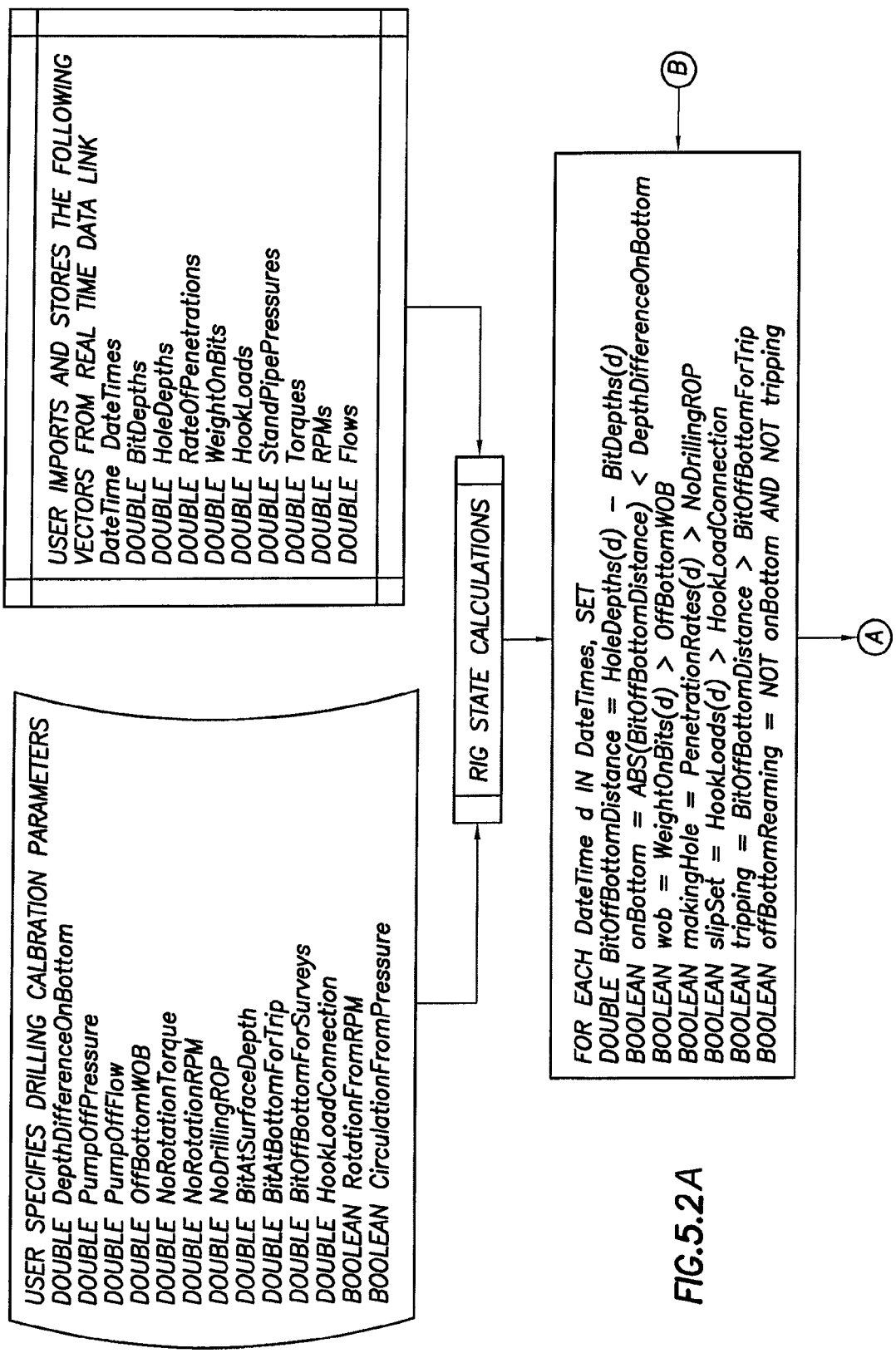
FIG.5.2A

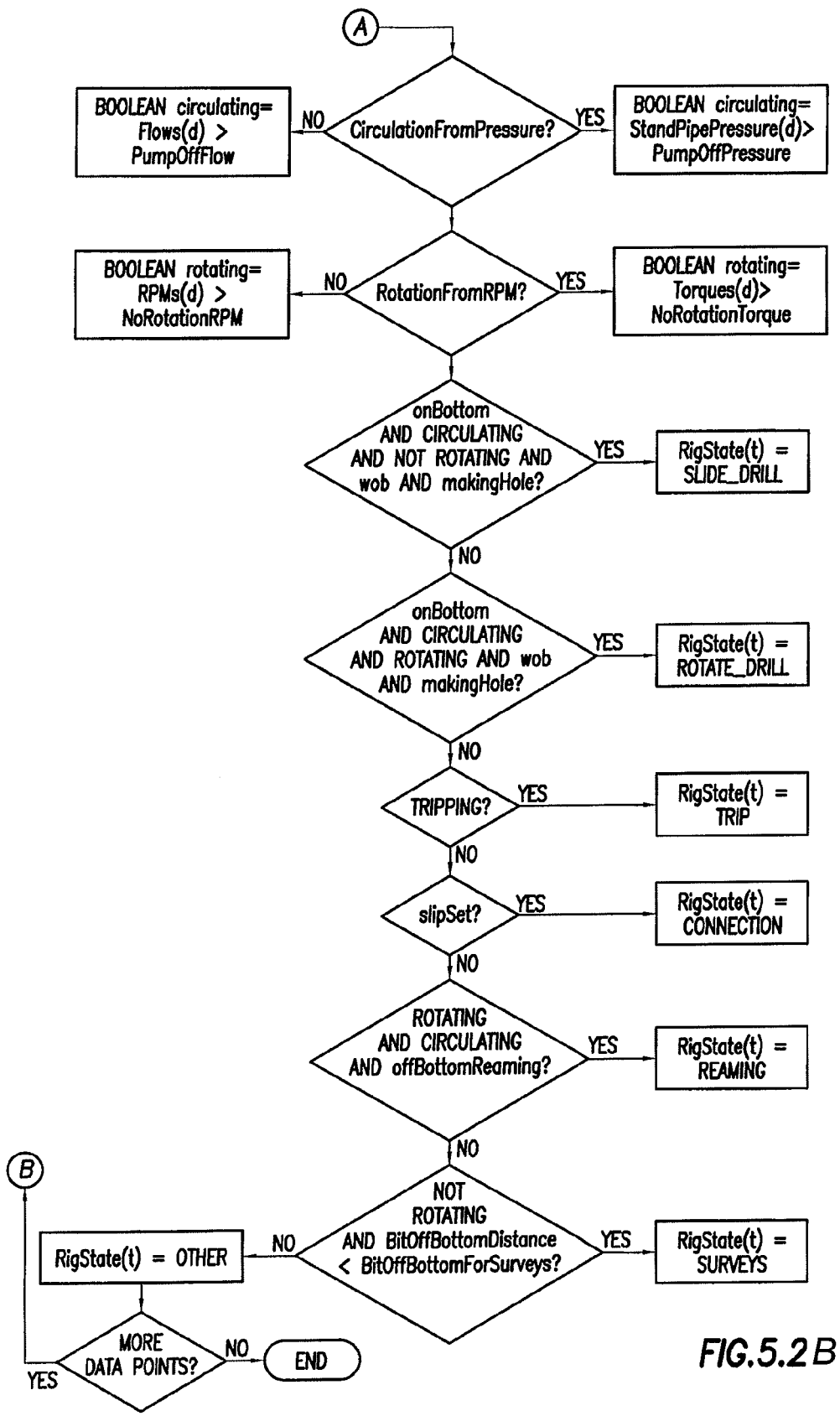
FIG.5.2B

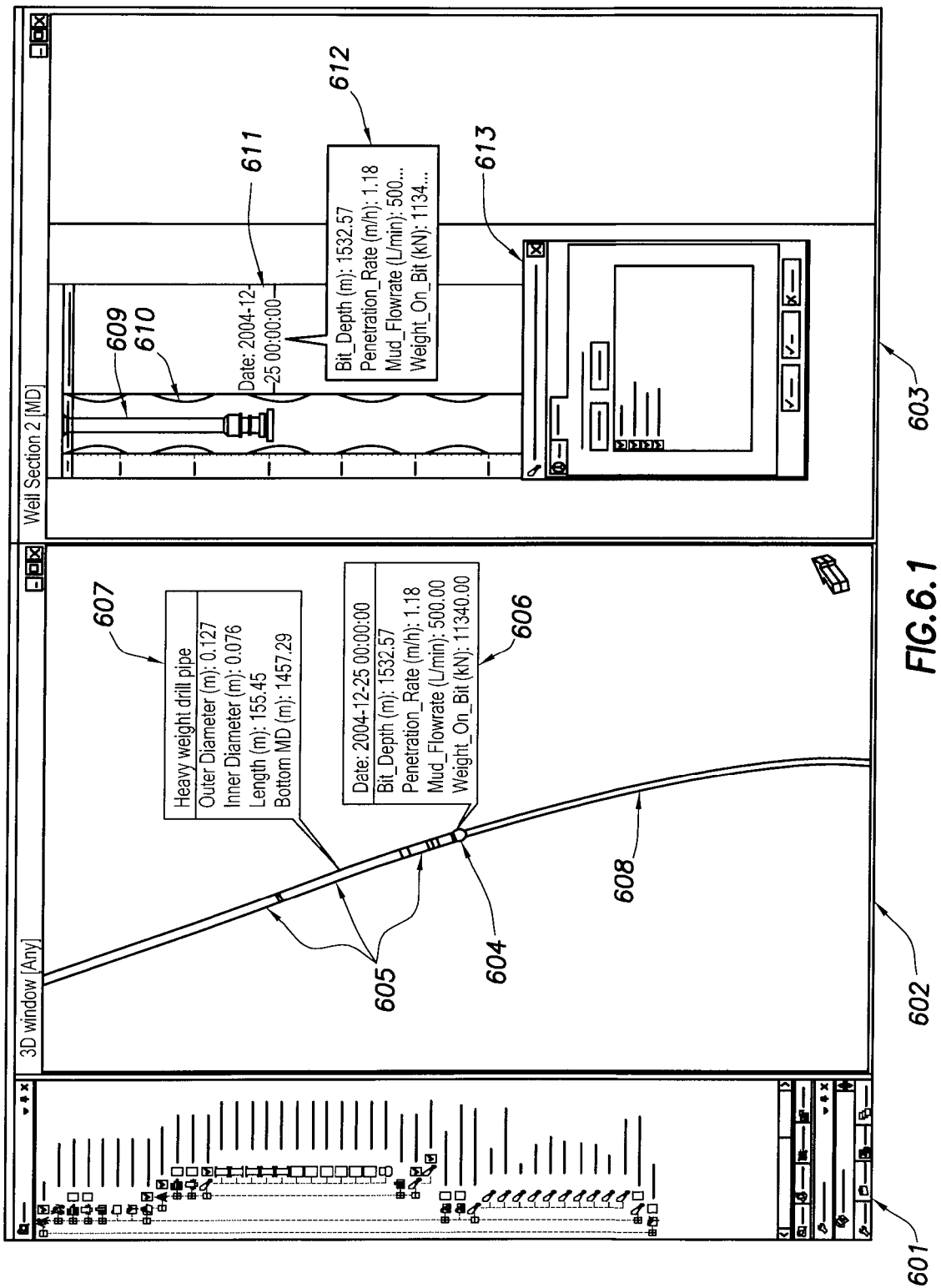
FIG.6.1

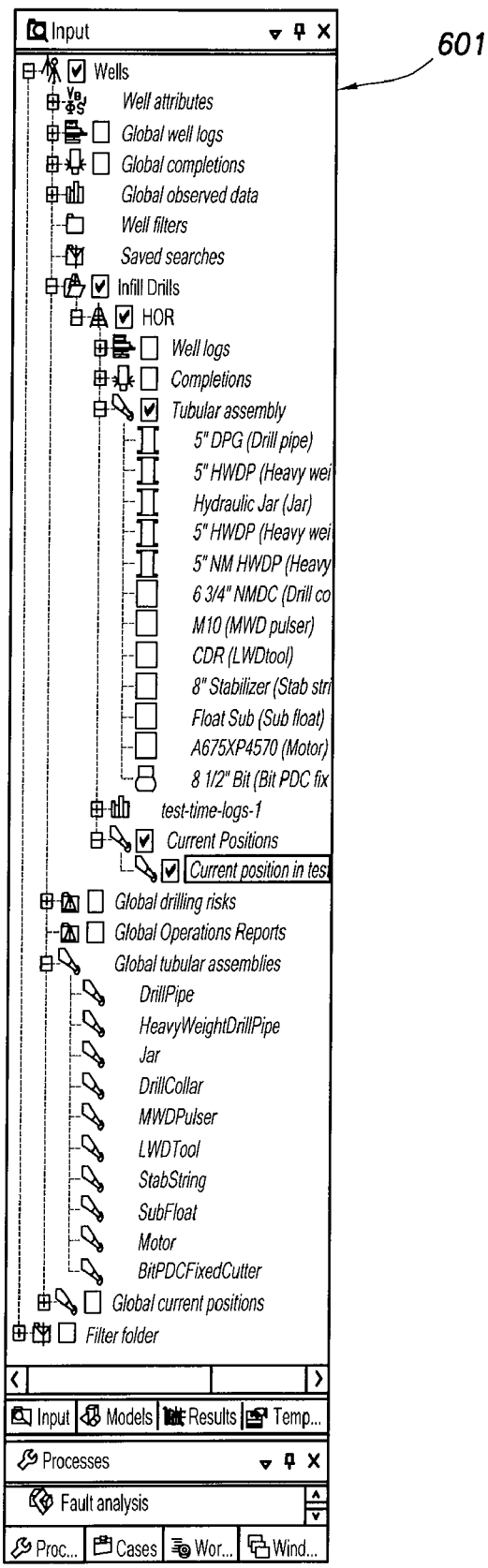
FIG.6.2

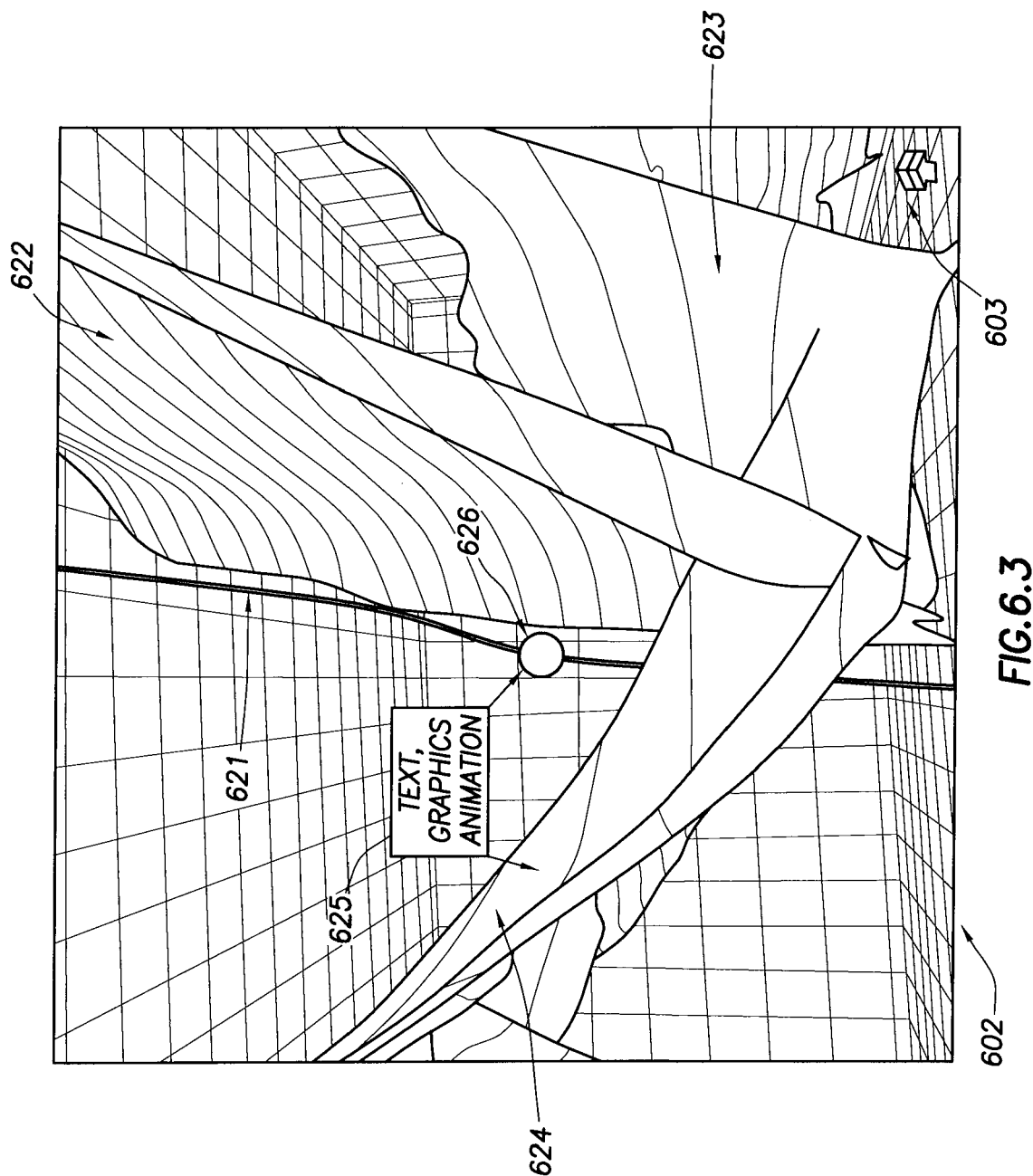
FIG.6.3

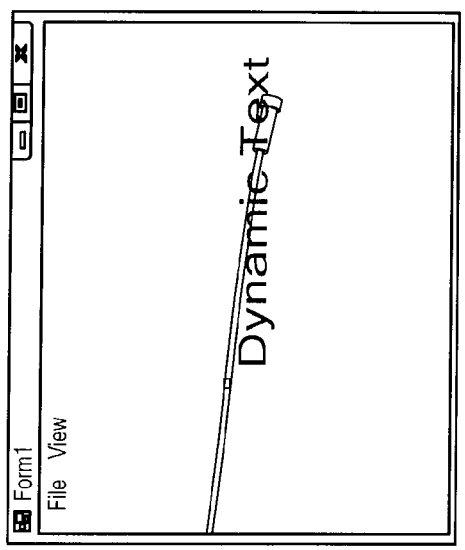
FIG.8.1
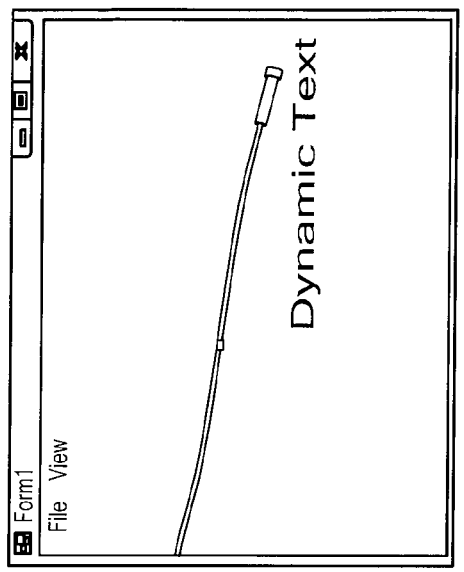
FIG.8.2
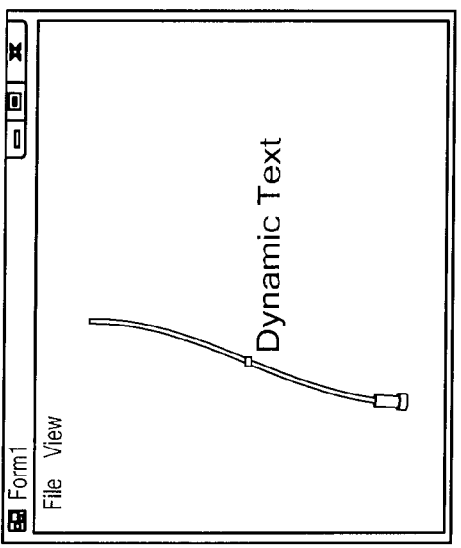
FIG.8.3
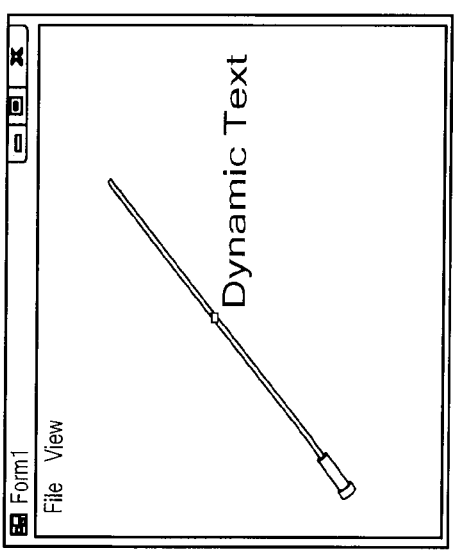
FIG.8.4
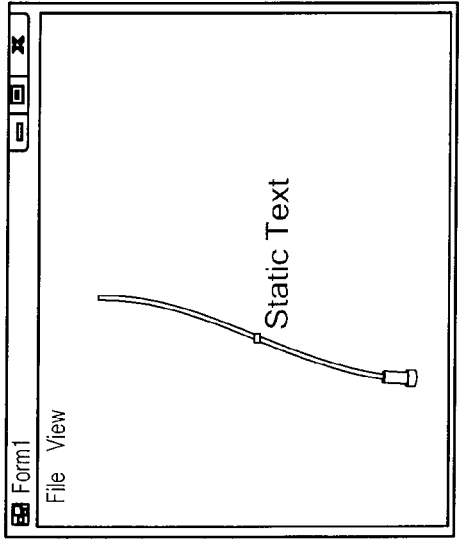
FIG.8.5
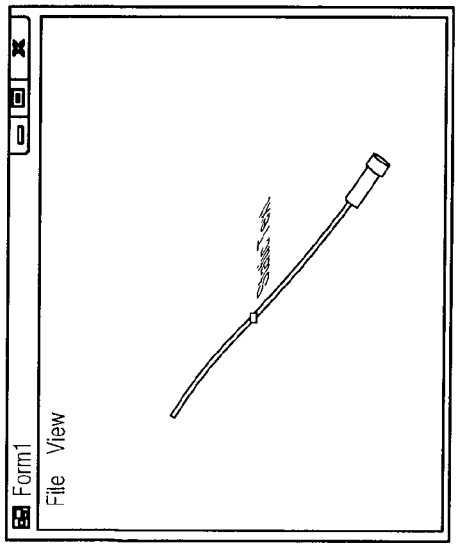
FIG.8.6

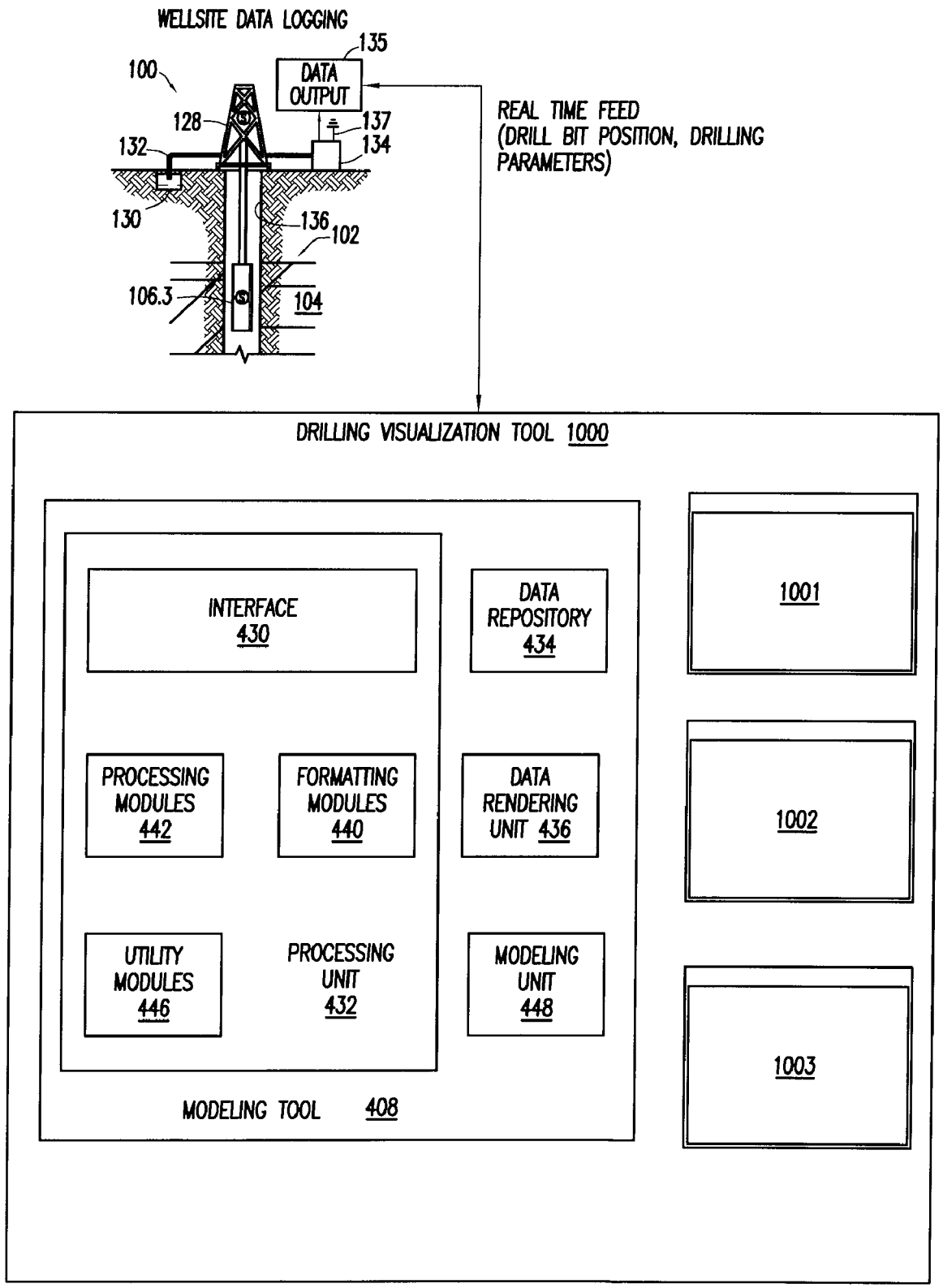
FIG.10.1

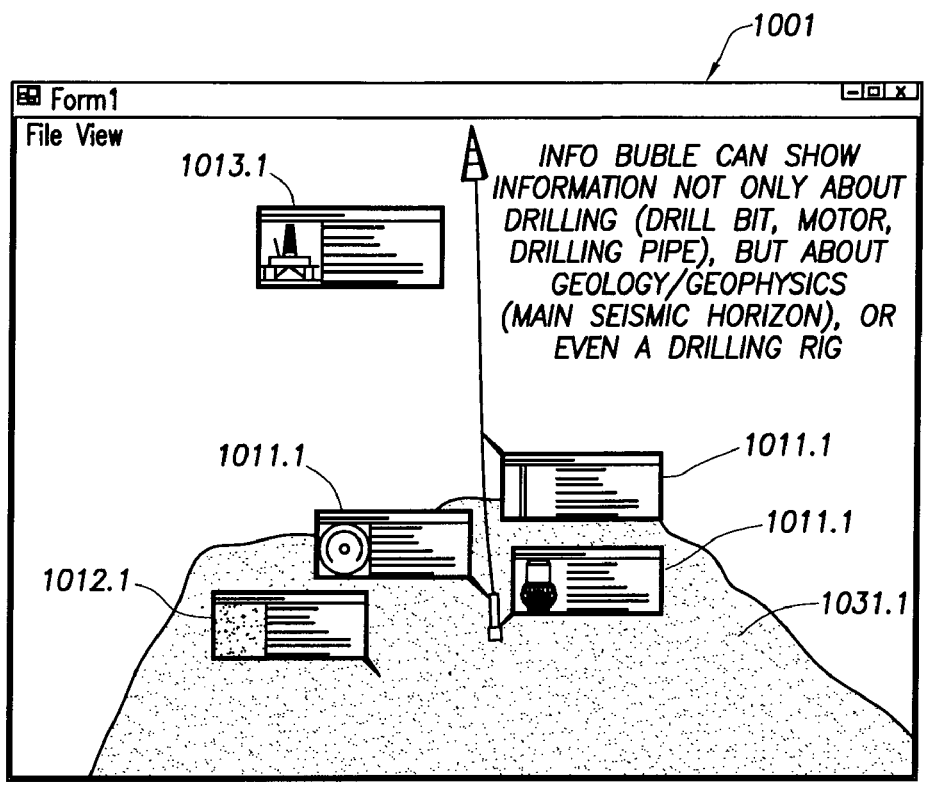
FIG.10.2
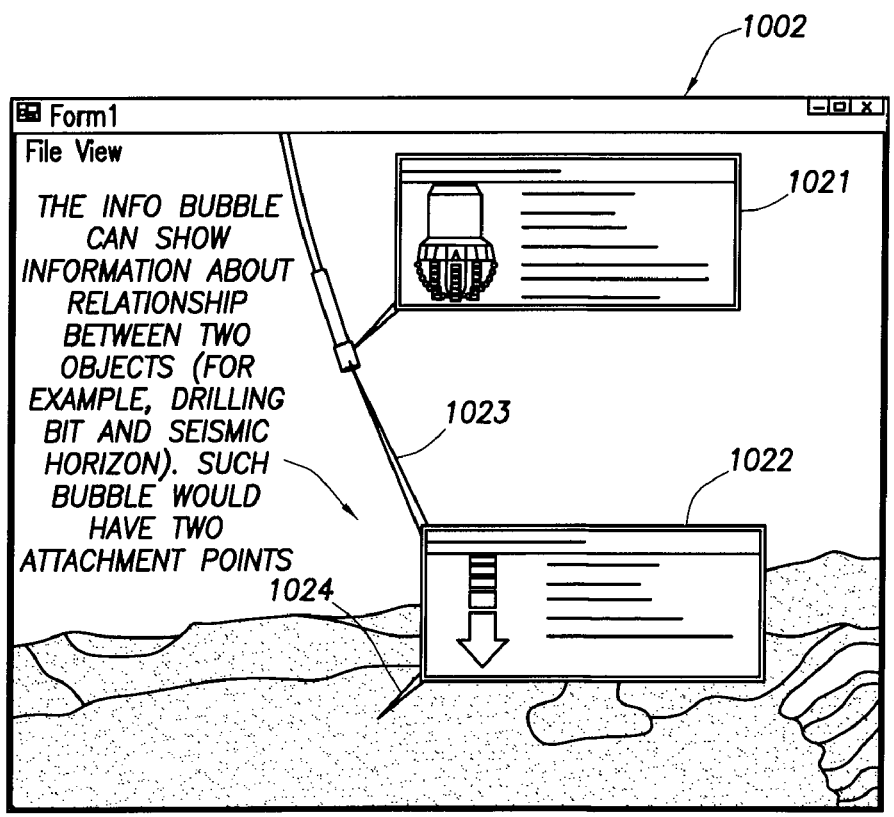
FIG.10.3

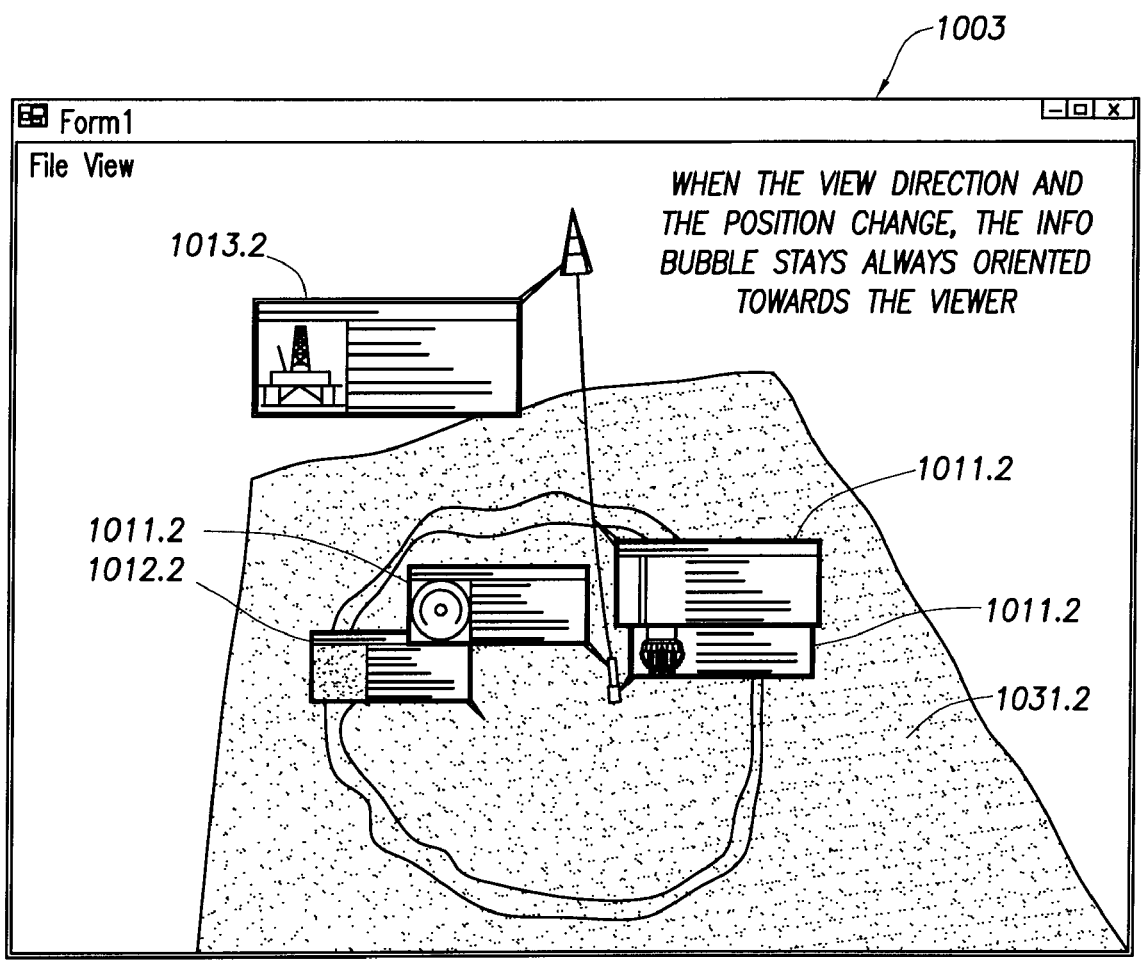
FIG.10.4

VISUALIZATION TECHNIQUES FOR OILFIELD OPERATIONS

CROSS REFERENCE TO RELATED APPLICATIONS

This application claims priority under 35 U.S.C. §119 from Provisional Patent Application No. 61/036,875 filed Mar. 14, 2008, entitled "System and Method for Performing Oilfield Operations Using Visualization Techniques," which is hereby incorporated by reference in its entirety. In addition, the subject matter described in this application may be related to patent application Ser. No. 12/021,258 filed Jan. 28, 2008.

BACKGROUND

Oilfield operations, such as surveying, drilling, wireline testing, completions and production, are typically performed to locate and gather valuable downhole fluids. Drilling and well operational information may be visualized in three dimensions (3D) in the context of an earth model. Modern Geology, Geophysics, Drilling, and Production (GGDP) applications employ a 3D canvas to show 3D view of different GGDP related objects (such as earth layers and faults, drilling platform positions, boreholes drilled from platforms, BHA used to drill boreholes, drilling events and risks encountered while drilling, pipeline routes and etc.) and their relative positions. While drawing the physical objects of an earth model is relatively straightforward, displaying information that annotates these objects poses some difficulty. Specifically, 3D objects can be viewed from different viewpoints and under different angles while annotation information is intrinsically two dimensional.

SUMMARY

In general, in one aspect, the visualization techniques for oilfield operations relates to a method of visualizing oilfield data for an oilfield operation. The method includes obtaining the oilfield data, at least a first portion of the oilfield data being real-time data generated from a borehole of an oilfield at a plurality of time segments, generating a current position object comprising current position information of an oilfield object in the borehole, updating the current position object responsive to receiving the real-time data at one or more of the plurality of time segments, displaying a representation of a first geology, geophysics, drilling, and production object in a display based on a second portion of the oilfield data, annotating the representation of the first geology, geophysics, drilling, and production object using a two dimensional (2D) callout, the 2D callout comprising an attachment handle coupled to the representation of the first geology, geophysics, drilling, and production object in the display, updating the display in an animation sequence in real-time, responsive to updating the current position object, by displaying the representation of the first geology, geophysics, drilling, and production object at an updated location and adjusting the 2D callout according to the updated location, and selectively adjusting the oilfield operation based on the display.

Other aspects of visualization techniques for oilfield operations will be apparent from the following description and the appended claims.

BRIEF DESCRIPTION OF DRAWINGS

FIGS. 1.1-1.4 show a schematic view of an oilfield having subterranean structures containing reservoirs therein, various oilfield operations being performed on the oilfield.

FIGS. 2.1-2.4 show graphical depictions of data collected by the tools of FIGS. 1.1-1.4, respectively.

FIG. 5.1 shows a flow chart of a method of visualizing an operation of an oilfield.

FIG. 5.2 shows an example algorithm of performing an operation of an oilfield. FIG. 5.2 includes FIGS. 5.2A and 5.2B for clarity of illustration.

FIGS. 6.1 and 6.2 show a screen shot of an example display representing a portion of the oilfield operation.

FIG. 6.3 shows an example representation of oilfield objects in the 3D display.

FIGS. 8.1-8.6 and 9 show methods of annotating a display representing operations of an oilfield.

FIG. 10 shows a schematic diagram of a drilling visualization tool for visualizing oilfield objects. FIG. 10 includes FIGS. 10.1-10.4 for clarity of illustration.

DETAILED DESCRIPTION

Figure 3:
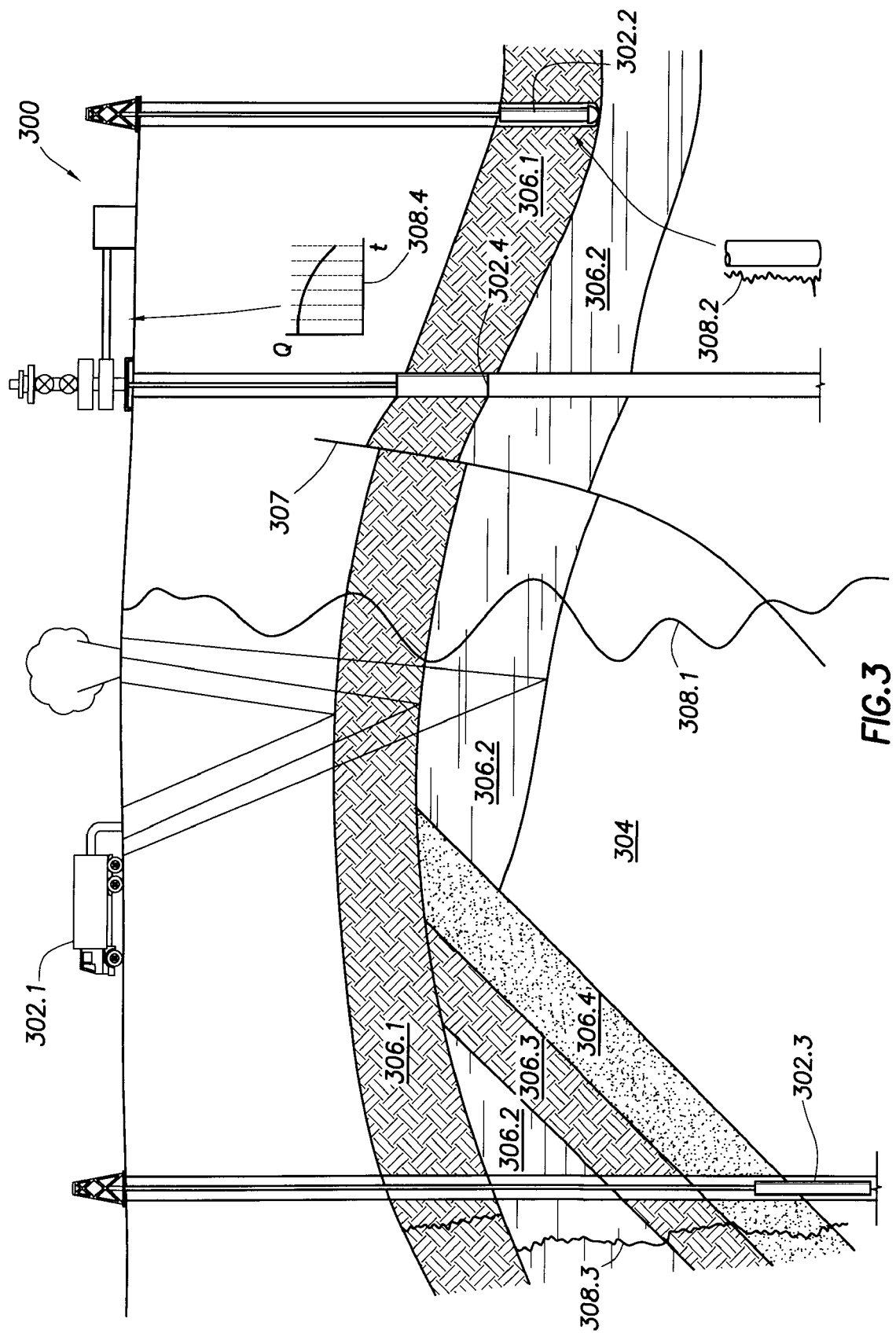
FIG. 3 shows a schematic view, partially in cross-section of operations of an oilfield.

Specific embodiments of visualization techniques for oilfield operations will now be described in detail with reference to the accompanying figures. Like elements in the various figures are denoted by like reference numerals for consistency.

In the following detailed description of embodiments, numerous specific details are set forth in order to provide a more thorough understanding of visualization techniques for oilfield operations. In other instances, well-known features have not been described in detail to avoid obscuring visualization techniques for oilfield operations.

In general, visualization techniques for oilfield operations relate to the integration of geoscience modeling software and a Well Planning System (WPS) to model and display data associated with multiple domains, such as a well bore geometry, drilling parameters, a risk quantification, and the time and cost to drill a well in a geological context and potentially across multiple perspectives. More particularly, visualization techniques for oilfield operations relate to techniques for performing drilling operations involving an analysis of drilling equipment, drilling conditions and other oilfield parameters that impact the drilling operations.

FIGS. 1.1-1.4 illustrate an example oilfield (100) with subterranean structures and geological structures therein. More specifically, FIGS. 1.1-1.4 depict schematic views of an oilfield (100) having subterranean structures (102) containing a reservoir (104) therein and depicting various oilfield operations being performed on the oilfield (100). Various measurements of the subterranean formation are taken by different tools at the same location. These measurements may be used to generate information about the formation and/or the geological structures and/or fluids contained therein.

FIG. 1.1 depicts a survey operation being performed by a seismic truck (106.1) to measure properties of the subterranean formation. The survey operation is a seismic survey operation for producing sound vibrations. In FIG. 1.1, an acoustic source (110) produces sound vibrations (112) that reflect off a plurality of horizons (114) in an earth formation 116. The sound vibration(s) (112) is (are) received in by sensors, such as geophone-receivers (118), situated on the earth's surface, and the geophones (118) produce electrical output signals, referred to as data received (120) in FIG. 1.

The received sound vibration(s) (112) are representative of different parameters (such as amplitude and/or frequency). The data received (120) is provided as input data to a computer (122.1) of the seismic recording truck (106.1), and responsive to the input data, the recording truck computer (122.1) generates a seismic data output record (124). The seismic data may be further processed as desired, for example by data reduction.

FIG. 1.2 depicts a drilling operation being performed by a drilling tool (106.2) suspended by a rig (128) and advanced into the subterranean formation (102) to form a wellbore (136). A mud pit (130) is used to draw drilling mud into the drilling tool via flow line (132) for circulating drilling mud through the drilling tool (106.2) and back to the surface. The drilling tool (106.2) is advanced into the formation to reach reservoir (104). The drilling tool (106.2) may be adapted for measuring downhole properties. The logging while drilling tool may also be adapted for taking a core sample (133) as shown, or removed so that a core sample may be taken using another tool.

A surface unit (134) is used to communicate with the drilling tool and offsite operations. The surface unit (134) is capable of communicating with the drilling tool to send commands to drive the drilling tool, and to receive data therefrom. The surface unit (134) may be provided with computer facilities for receiving, storing, processing and analyzing data from the oilfield (100). The surface unit (134) collects data output (135) generated during the drilling operation. Computer facilities, such as those of the surface unit (134), may be positioned at various locations about the oilfield (100) and/or at remote locations.

Sensors (S), such as gauges, may be positioned throughout the reservoir, rig, oilfield equipment (such as the downhole tool) or other portions of the oilfield (100) for gathering information about various parameters, such as surface parameters, downhole parameters and/or operating conditions. These sensors (S) may measure oilfield parameters, such as weight on bit, torque on bit, pressures, temperatures, flow rates, compositions, measured depth, azimuth, inclination and other parameters of the oilfield operation.

The information gathered by the sensors (S) may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other wellbores.

Data outputs from the various sensors (S) positioned about the oilfield (100) may be processed for use. The data may be may be historical data, real-time data or combinations thereof. The real-time data may be used in real-time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical and/or reservoir engineering simulations. The reservoir, wellbore, surface and/or process data may be used to perform reservoir, wellbore, or other production simulations. The data outputs from the oilfield operation may be generated directly from the sensors (S), or after some preprocessing or modeling. These data outputs may act as inputs for further analysis.

The data is collected and stored at the surface unit (134). One or more surface units may be located at the oilfield (100), or linked remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions of the oilfield (100) and/or other locations. The surface unit (134) may also be provided with or functionally linked to a controller for actuating mechanisms at the oilfield (100). The surface unit (134) may then send command signals to the oilfield (100) in response to data received. The surface unit (134) may receive commands via the transceiver or may itself execute commands to the controller. A processor (not show) may be provided to analyze the data (locally or remotely) and make the decisions to actuate the controller. In this manner, the oilfield (100) may be selectively adjusted based on the data collected. These adjustments may be made automatically based on computer protocol, or manually by an operator. In some cases, well plans and/or well placement may be adjusted to select optimum operating conditions, or to avoid problems.

FIG. 1.3 depicts a wireline operation being performed by a wireline tool (106.3) suspended by the rig (128) and into the wellbore (136) of FIG. 1.2. The wireline tool (106.3) may be adapted for deployment into a wellbore for performing well logs, performing downhole tests and/or collecting samples. The wireline tool (106.3) may be used to provide another method and apparatus for performing a seismic survey operation. The wireline tool (106.3) of FIG. 1.3 may have an explosive or acoustic energy source that provides electrical signals to the surrounding subterranean formations (102).

The wireline tool (106.3) may be operatively linked to, for example, the geophones (118) stored in the computer (122.1) of the seismic recording truck (106.1) of FIG. 1.1. The wireline tool (106.3) may also provide data to the surface unit (134). As shown data output (135) is generated by the wireline tool (106.3) and collected at the surface. The wireline tool (106.3) may be positioned at various depths in the wellbore to provide a survey of the subterranean formation (102).

FIG. 1.4 depicts a production operation being performed by a production tool (106.4) deployed from a production unit or Christmas tree (129) and into the completed wellbore (136) of FIG. 1.3 for drawing fluid from the downhole reservoirs into surface facilities (142). Fluid flows from reservoir (104) through perforations in the casing (not shown) and into the production tool (106.4) in the wellbore (136) and to the surface facilities (142) via a gathering network (146). Sensors (S) positioned about the oilfield (100) are operatively connected to a surface unit (134) for collecting data therefrom. During the production process, data output (135) may be collected from various sensors (S) and passed to the surface unit (134) and/or processing facilities. This data may be, for example, reservoir data, wellbore data, surface data and/or process data. As shown, the sensor (S) may be positioned in the production tool (106.4) or associated equipment, such as the Christmas tree, gathering network, surface facilities (142) and/or the production facility, to measure fluid parameters, such as fluid composition, flow rates, pressures, temperatures, and/or other parameters of the production operation.

While only one wellsite is shown, it will be appreciated that the oilfield (100) may cover a portion of land that hosts one or more wellsites. One or more gathering facilities may be operatively connected to one or more of the wellsites for selectively collecting downhole fluids from the wellsite(s).

Throughout the oilfield operations depicted in FIGS. 1.1-1.4, there are numerous business considerations. For example, the equipment used in each of these figures has various costs and/or risks associated therewith. At least some of the data collected at the oilfield (100) relates to business considerations, such as value and risk. This business data may include, for example, production costs, rig time, storage fees, price of oil/gas, weather considerations, political stability, tax rates, equipment availability, geological environment and other factors that affect the cost of performing the oilfield operations or potential liabilities relating thereto. Decisions may be made and strategic business plans developed to alleviate potential costs and risks. For example, an oilfield plan may be based on these business considerations. Such an oilfield plan may, for example, determine the location of the rig, as well as the depth, number of wells, duration of operation and other factors that will affect the costs and risks associated with the oilfield operation.

While FIG. 1 depicts monitoring tools used to measure properties of an oilfield (100), it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation (102) and/or its geological structures may be used. Various sensors (S) may be located at various positions along the subterranean formation and/or the monitoring tools to collect and/or monitor the desired data. Other sources of data may also be provided from offsite locations.

The oilfield configuration of FIG. 1 is not intended to limit the scope of visualization techniques for oilfield operations. Part, or all, of the oilfield (100) may be on land and/or sea. Also, while a single oilfield measured at a single location is depicted, the visualization techniques for oilfield operations may be utilized with any combination of one or more oilfields, one or more processing facilities and one or more wellsites.

FIGS. 2.1-2.4 are graphical depictions of data collected by the tools of FIGS. 1.1-1.4, respectively. FIG. 2.1 depicts a seismic trace (202) of the subterranean formation of FIG. 1.1 taken by survey tool (106.1). The seismic trace measures the two-way response over a period of time. FIG. 2.2 depicts a core sample (133) taken by the logging tool (106.2) of FIG. 1.1. The core test typically provides a graph of the density, resistivity or other physical property of the core sample over the length of the core. FIG. 2.3 depicts a well log (204) of the subterranean formation of FIG. 1.3 taken by the wireline tool (106.3). The wireline log typically provides a resistivity measurement of the formation at various depths. FIG. 2.4 depicts a production decline curve (206) of fluid flowing through the subterranean formation of FIG. 1.4 taken by the production tool (106.4). The production decline curve typically provides the production rate (Q) as a function of time (t).

The respective graphs of FIGS. 2.1-2.3 contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2.4 provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

The models may be used to create an earth model defining the subsurface conditions. This earth model predicts the structure and its behavior as oilfield operations occur. As new information is gathered, part or all of the earth model may be adjusted.

FIG. 3 is a schematic view, partially in cross section of an oilfield (300) having data acquisition tools (302.1), (302.2), (302.3), and (302.4) positioned at various locations along the oilfield (300) for collecting data of the subterranean formation (304). The data acquisition tools (302.1)-(302.4) may be the same as data acquisition tools (106.1)-(106.4) of FIG. 1, respectively. As shown, the data acquisition tools (302.1)-(302.4) generate data plots or measurements (308.1)-(308.4), respectively.

Data plots (308.1)-(308.3) are examples of static data plots that may be generated by the data acquisition tools (302.1)-(302.4), respectively. Static data plot (308.1) is a seismic two-way response time and may be the same as the seismic trace (202) of FIG. 2.1. Static plot (308.2) is core sample data measured from a core sample of the formation (304), similar to core sample (133) of FIG. 2.2. Static data plot (308.3) is a logging trace, similar to the well log (204) of FIG. 2.3. Data plot (308.4) is a dynamic data plot of the fluid flow rate over time, similar to the graph (206) of FIG. 2.4. Other data may also be collected, such as historical data, user inputs, economic information other measurement data and other parameters of interest.

The subterranean formation (304) has a plurality of geological structures (306.1)-(306.5). In one or more embodiments, the subterranean formation is a volcanic reservoir formation. As shown, the formation (304) has a first formation layer (306.1), a second formation layer (306.2), a third formation layer (306.3), and a fourth formation layer (306.4). In one or more embodiments, the third formation layer (306.3) is a shale layer and the fourth formation layer (306.4) is a sand layer. Those skilled in the art, having the benefit of this detailed description, will appreciate the subterranean formation (304) may have any number of layers. A fault line (307) extends through the formation. The static data acquisition tools may be adapted to measure the formation (304) and detect the characteristics of the geological structures of the formation (304).

While a specific subterranean formation with specific geological structures is depicted, it will be appreciated that the formation may contain a variety of geological structures. Fluid may also be present in various portions of the formation. Each of the measurement devices may be used to measure properties of the formation and/or its underlying structures. While each acquisition tool (e.g., (302.1)-(302.4)) is shown as being in specific locations along the formation, it will be appreciated that one or more types of measurement may be taken at one or more location across one or more oilfields or other locations for comparison and/or analysis. Typically, seismic data displayed in the static data plot (308.1) from the data acquisition tool (302.1) is used by a geophysicist to determine characteristics of the subterranean formation (304). Core data shown in static plot (308.2) and/or log data from the well log (308.3) are typically used by a geologist to determine various characteristics of the geological structures of the subterranean formation (304). Production data from the production graph (308.4) is typically used by the reservoir engineer to determine fluid flow reservoir characteristics.

Further, one or more data sets may be visualized simultaneously to provide a broader view of the features of the subterranean formations.

Figure 4:
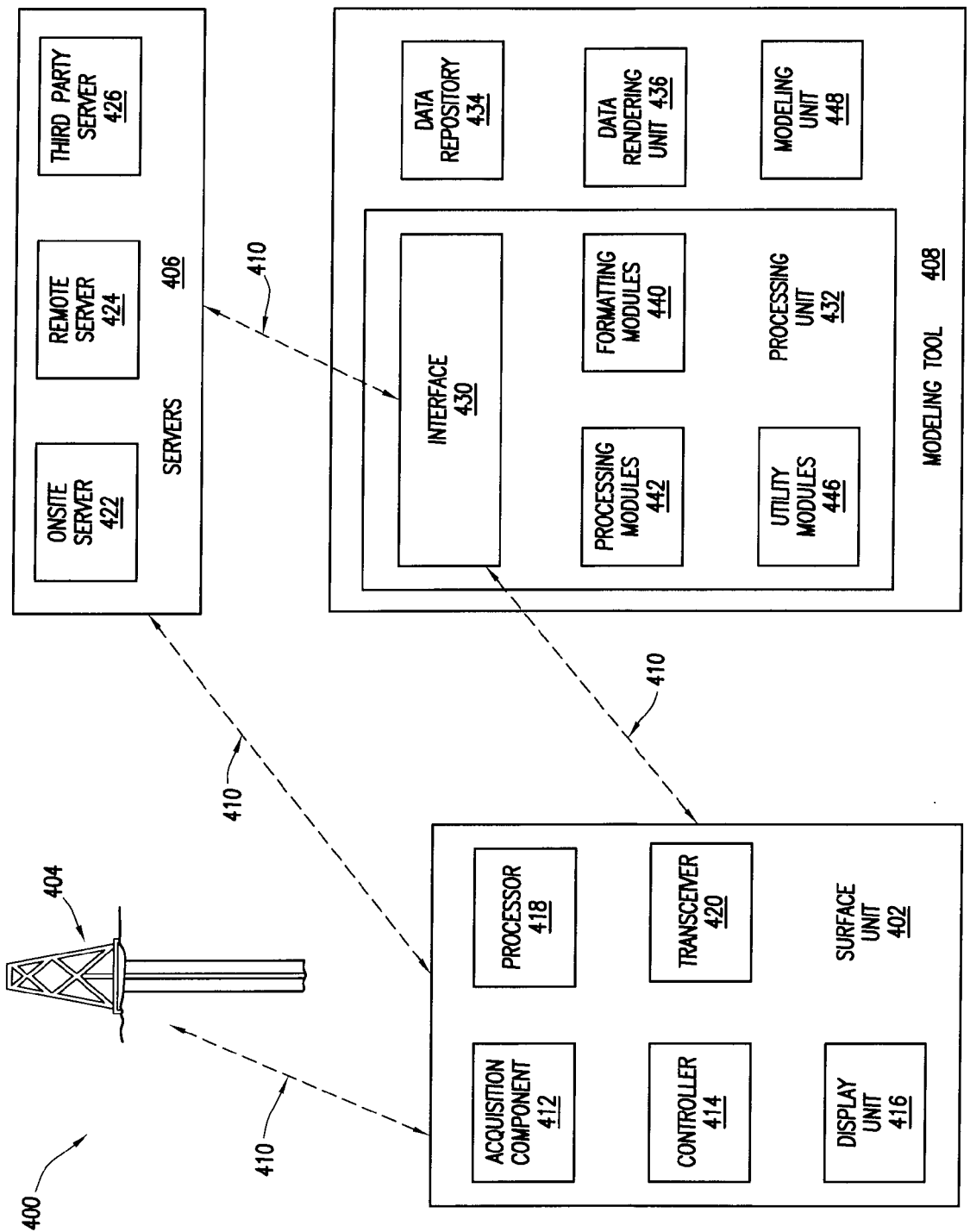
FIG. 4 shows a schematic diagram of a system for performing a drilling operation of an oilfield.

FIG. 4 depicts a schematic view of a system (400) for performing a drilling operation of an oilfield. As shown, the system (400) includes a surface unit (402) operatively connected to a wellsite drilling system (404), servers (406) operatively linked to the surface unit (402), and a modeling tool (408) operatively linked to the servers (406). As shown, communication links (410) are provided between the wellsite drilling system (404), surface unit (402), servers (406), and modeling tool (408). A variety of links may be provided to facilitate the flow of data through the system. For example, the communication links (410) may provide for continuous, intermittent, one-way, two-way and/or selective communication throughout the system (400). The communication links (410) may be of any type, such as wired, wireless, etc.

The wellsite drilling system (404) and surface unit (402) may be the same as the wellsite drilling system and surface unit of FIG. 3. The surface unit (402) may be provided with an acquisition component (412), a controller (414), a display unit (416), a processor (418), and a transceiver (420). The acquisition component (412) collects and/or stores data of the oilfield. This data may be data measured by the sensors (S) of the wellsite as described with respect to FIG. 3. This data may also be data received from other sources.

The controller (414) is enabled to enact commands at the oilfield. The controller (414) may be provided with actuation means that can perform drilling operations, such as steering, advancing, or otherwise taking action at the wellsite. Commands may be generated based on logic of the processor (418), or by commands received from other sources. The processor (418) may be provided with features for manipulating and analyzing the data. The processor (418) may be provided with additional functionality to perform oilfield operations.

A display unit (416) may be provided at the wellsite and/or remote locations for viewing oilfield data (not shown). The oilfield data presented by a display unit (416) may be raw data, processed data and/or data outputs generated from various data. The display unit (416) may be adapted to provide flexible views of the data, so that the screens depicted may be customized as desired. A user may determine the desired course of action during drilling based on reviewing the displayed oilfield data. The drilling operation may be selectively adjusted in response to the display unit (416). The display unit (416) may include a two dimensional display for viewing oilfield data. The display unit (416) may also include a three dimensional display for viewing various aspects of the drilling operation. At least some aspect of the drilling operation may be viewed in real-time in the three dimensional display.

The transceiver (420) provides a means for providing data access to and/or from other sources. The transceiver (420) also provides a means for communicating with other components, such as the servers (406), the wellsite drilling system (404), surface unit (402) and/or the modeling tool (408).

The servers (406) may be used to transfer data from one or more wellsites to the modeling tool (408). As shown, the server (406) includes onsite servers (422), a remote server (424) and a third party server (426). The onsite servers (422) may be positioned at the wellsite and/or other locations for distributing data from the surface unit (402). The remote server (424) is positioned at a location away from the oilfield and provides data from remote sources. The third party server (426) may be onsite or remote, but is operated by a third party, such as a client.

The servers (406) may be capable of transferring drilling data, such as logs, drilling events, trajectory, and/or other oilfield data, such as seismic data, historical data, economics data, or other data that may be of use during analysis. The type of server is not intended to limit the invention. The system (400) may be adapted to function with any type of server that may be employed.

The servers (406) communicate with the modeling tool (408) as indicated by the communication links (410). As indicated by the multiple arrows, the servers (406) may have separate communication links (410) with the modeling tool (408). One or more of the servers may be combined or linked to provide a combined communication link (410).

The servers (406) collect a wide variety of data. The data may be collected from a variety of channels that provide a certain type of data, such as well logs. The data from the servers (406) is passed to the modeling tool (408) for processing. The servers (406) may also be used to store and/or transfer data.

The modeling tool (408) is operatively linked to the surface unit (402) for receiving data therefrom. In some cases, the modeling tool (408) and/or server(s) (406) may be positioned at the wellsite. The modeling tool (408) and/or server(s) (406) may also be positioned at various locations. The modeling tool (408) may be operatively linked to the surface unit (402) via the server(s) (406). The modeling tool (408) may also be included in or located near the surface unit (402).

The modeling tool (408) includes an interface (430), a processing unit (432), a modeling unit (448), a data repository (434) and a data rendering unit (436). The interface (430) communicates with other components, such as the servers (406). The interface (430) may also permit communication with other oilfield or non-oilfield sources. The interface (430) receives the data and maps the data for processing. Data from servers (406) typically streams along predefined channels which may be selected by the interface (430). The data collected from various sources may be processed by the processing unit (432) and stored in the data repository (434) as multiple data sets ready to be retrieved for evaluation. The data sets may include a 2D data set, a 3D data set (i.e., 3D volume data set), or other formats known within the art.

As depicted in FIG. 4, the interface (430) selects the data channel of the server(s) (406) and receives the data. The interface (430) also maps the data channels to data from the wellsite. The data may then be passed to the processing modules (442) of the modeling tool (408). The data may be immediately incorporated into the modeling tool (408) for real-time sessions or modeling. The interface (430) creates data requests (for example surveys, logs and risks), displays the user interface, and handles connection state events. The interface (430) also instantiates the data into a data object for processing.

The processing unit (432) includes formatting modules (440), processing modules (442), and utility modules (446). These modules are designed to manipulate the oilfield data for real-time analysis.

The formatting modules (440) are used to conform the data to a desired format for processing. Incoming data may be formatted, translated, converted, or otherwise manipulated for use. The formatting modules (440) are configured to enable the data from a variety of sources to be formatted and used so that the data processes and displays in real-time.

As shown, the formatting modules (440) include components for formatting the data, such as a unit converter and the mapping components. The unit converter converts individual data points received from the interface into the format expected for processing. The format may be defined for specific units, provide a conversion factor for converting to the desired units, or allow the units and/or conversion factor to be defined. To facilitate processing, the conversions may be suppressed for desired units.

The mapping component maps data according to a given type or classification, such as a certain unit, log mnemonics, precision, max/min of color table settings, etc. The type for a given set of data may be assigned, particularly when the type is unknown. The assigned type and corresponding map for the data may be stored in a file (i.e. XML) and recalled for future unknown data types.

The utility modules (446) provide support functions to the drilling system. The utility modules (446) include the logging component (not shown) and the user interface (UI) manager component (not shown). The logging component provides a common call for all logging data. This module allows the logging destination to be set by the application. The logging module may also be provided with other features, such as a debugger, a messenger, and a warning system, among others. The debugger sends a debug message to those using the system. The messenger sends information to subsystems, users, and others. The information may or may not interrupt the operation and may be distributed to various locations and/or users throughout the system. The warning system may be used to send error messages and warnings to various locations and/or users throughout the system. In some cases, the warning messages may interrupt the process and display alerts.

The UI manager component creates user interface elements for displays. The UI manager component defines user input screens, such as menu items, context menus, toolbars, and settings windows. The UI manager may also be used to handle events relating to these user input screens.

The processing module (442) is used to analyze the data and generate outputs. As described above, the data may include static data, dynamic data, historic data, real-time data, or other types of data. Further, the data may relate to various aspects of the oilfield operations, such as formation structure, geological stratigraphy, core sampling, well logging, density, resistivity, fluid composition, flow rate, downhole condition, surface condition, equipment condition, or other aspects of the oilfield operations.

The processing module (442) may be used to analyze the data for generating an earth model and making decisions at various locations of the oilfield at various times. For example, an oilfield event, such as a drilling event, a risk, a lesson learned, a best practice, or some other types of oilfield events may be defined from analyzing the data. Examples of drilling events include, but are not limited to, a stuck pipe, a loss of circulation, shocks observed, or some other drilling event encountered in real-time during drilling at various depths and lasting for various durations. Examples of risks include, but are not limited to, a potential directional control issue from formation dips, a potential shallow water flow issue, or some other potential risk issue. The risk issues may be predicted from analyzing the earth model based on historic data compiled prior to drilling or real-time data acquired during drilling. Lessons learned and best practice may be developed from neighboring wellbores with similar conditions or equipment and defined as oilfield events for reference in determining a desired course of action during drilling.

In a drilling operation in an oilfield, usually a large number of such oilfield events exist that occur along the wellbore trajectory. The oilfield events often overlap each other in certain depth regions (i.e., start depth and end depth) along the trajectory. The processing module (442) generates the oilfield events, which can be shown in positions relative to the wellbore trajectory along with event attributes (e.g., severity and probability) annotated for making decisions at various locations of the oilfield at various times. The expanse of certain depths of the oilfield event can also be shown for comparing the event with geological features surrounding the wellbore trajectory.

As noted above, the processing module (442) is used to analyze the data and generate outputs. The processing component includes a trajectory management component (not shown).

The trajectory management component handles incoming trajectory data indicating a special situation (such as the data pertains to depths that are not strictly increasing or the data indicates that a sidetrack borehole path is being created). For example, when a sample is received with a measured depth (MD) shallower than the hole depth, the trajectory module determines how to process the data. In this example, the trajectory module may ignore all incoming survey points until the MD exceeds the previous MD on the wellbore path, merge all incoming survey points below a specified depth with the existing samples on the trajectory, ignore points above a given depth, delete the existing trajectory data and replace it with a new survey that starts with the incoming survey station, create a new well and set its trajectory to the incoming data, add incoming data to this new well, and/or prompt the user for each invalid point. All of these options may be exercised in combinations and can be automated or set manually.

The data repository (434) may store the data for the modeling unit. The data may be stored in a format available for use in real-time (e.g., information is updated at approximately the same rate the information is received). The data is generally passed to the data repository from the processing component. The data can be persisted in the file system (e.g., as an extensible markup language (XML) file) or in a database. The system (400) determines which storage is the most appropriate to use for a given piece of data and stores the data in a manner that enables an automatic flow of the data throughout the rest of the system (400) in a seamless and integrated fashion. The system also facilitates manual and automated workflows (such as Modeling, Geological & Geophysical workflows) based upon the persisted data.

The data rendering unit (436) performs rendering algorithm calculation to provide one or more displays for visualizing the data. The displays may be presented to a user at the display unit (416). The data rendering unit (436) may contain a 2D canvas, a 3D canvas, a well section canvas or other canvasses, as desired.

The data rendering unit (436) may selectively provide displays composed of any combination of one or more canvasses. The canvasses may or may not be synchronized with each other during display. The data rendering unit (436) may be provided with mechanisms for actuating various canvasses or other functions in the system. Further, the data rendering unit (436) may be configured to provide displays representing the oilfield events generated from the real-time drilling data acquired in real-time during drilling, the oilfield events generated from historic data of neighboring wellbores compiled over time, the current trajectory of the wellbore during drilling, the earth model generated from static data of subterranean geological features, and/or any combinations thereof. In addition, the data rendering unit (436) may be configured to selectively adjust the displays based on real-time drilling data as the drilling tool of the drilling system (404) advances into a subterranean formation.

The modeling unit (448) performs the key modeling functions for generating complex oilfield outputs. The modeling unit (448) may be a conventional modeling tool capable of performing modeling functions, such as generating, analyzing, and manipulating earth models. The earth models typically contain exploration and production data, such as that shown in FIG. 2.1-2.4.

While specific components are depicted and/or described for use in the units and/or modules of the modeling tool (408), it will be appreciated that a variety of components with various functions may be used to provide the formatting, processing, utility, and coordination functions necessary to provide real-time processing in the modeling tool (408). The components may include combined functionalities and may be implemented as software, hardware, firmware, or combinations thereof.

Further, components (e.g., the processing modules (442) and the data rendering unit (436)) of the modeling tool (408) may be located in an onsite server (422) or in distributed locations where the remote server (424) and/or the third party server (426) may be involved. The onsite server (422) may be located within the surface unit (402).

FIG. 5.1 depicts a flow chart showing elements of a method for visualizing a drilling operation of an oilfield. The method may be performed using, for example, the system of FIG. 4 for importing, visualizing, updating, and analyzing time-dependent oilfield data, such as real-time drilling data in the context of an earth model.

Initially, oilfield data, including real-time data (such as drilling data) generated from a borehole of the oilfield at multiple time segments during the drilling operation, is obtained (501). For example, the oilfield data may be obtained by the modeling tool of FIG. 4. In this example, the modeling tool may be installed in a surface unit. The oilfield data may be collected, monitored, and analyzed in the surface unit. Examples of oilfield data may include, but is not limited to, geology, geophysics, drilling, and production (GGDP) related data. In particular, the drilling data may include tubular component (e.g., bottom hole assemblies (BHAs) and drill pipes) related data, wellbore geometry (e.g., casing, tubing strings, perforations, packers, pumps, valves, etc.) related data, time logs (e.g., depth of bit, hook load, weight on bit, mud density, etc.), and operations reports. In this case, the position of the tubular components may vary in time as the drilling operation proceeds. The wellbore geometries and related equipments may be associated with a start date, end date, and dates of interest. Further, each of the time logs is a series of measurements defined over time and may refer to surface or downhole quantities. The operation reports contain details about the drilling activity entered at the wellsite at specific times.

This time dependent data may be imported from a real-time data link such as the servers and communication channels shown in FIG. 4. After being received by the modeling tool, the time dependent data may be stored in a data repository in various formats such as files, a relational database, an object oriented database, or other format suitable for use by the modeling tool. The processing unit, modeling unit, and rendering unit, all shown in FIG. 4, may process the time dependent data in computer memory associated with the modeling tool. In this case, the time dependent data may be organized as objects mimicking the physical entities in the oilfield (e.g., various components of the tubular components, wellbore geometries, etc.). The objects may include components that exist in the data repository and/or the computer memory associated with the modeling tool.

An important component of this time dependent data is the current position of an oilfield object (such as a drill bit) in the borehole, which is a function of time. The current position of an oilfield object is typically one of the time logs. A current position object may be created for containing the current position information of the oilfield object in the borehole (502). The current position object may be created as an object oriented data structure with components in the data repository and the computer memory associated with the modeling tool.

The current position information in the current position object may be updated responsive to receiving the real-time data, for example, the current position time log (503). For example, the time logs may be organized as object oriented data structures. A built-in function of the current position object may subscribe to monitoring the current position channel of the time log object and receive updated current position information accordingly.

In general, the GGDP related data may be processed by the modeling tool and displayed by a display unit of a surface unit, as shown in FIG. 4. The display unit may be used to display multiple windows for presenting a two dimensional (2D) display and/or a three dimensional (3D) display. The GGDP related data may be organized as GGDP objects mimicking real-world seismic objects (e.g., an earth layer, a fault, a horizon, etc.), drilling related objects (e.g., a drilling platform, a borehole, a BHA, a drill pipe, a drilling event, a risk, etc.), and production related objects (e.g., a tubular component, a casing, a tubing string, a perforation, a packer, a pump, a valve, a pipeline route, etc.). These GGDP objects may be selectively represented in the display in an animation sequence in real-time responsive to updating the current position object (504). For example, the display may be updated (or re-rendered) each time the current position object receives updated current position information from the time logs.

The current position object may also be represented as a moving icon in the display (505). For example, the current position object may be represented as a point, a sphere, or other suitable shapes in the 3D display. Alternatively, the current position object may also be represented as a horizontal line or other suitable shapes in depth indexed charts in a 2D display.

In addition, one or more time segments from the time logs may be stored as a collection of time segments (506). The collection of time segments may be used for playing back the animation sequence. For example, the current position information may be reset (i.e., updated) in the current position object to a playback start time based on a time segment selected from the collection of time segments (507). The current position object may be configured with a time player functionality that continues to update the current position object through subsequent time segments in the collection. The display may then be continuously re-rendered at each of these subsequent time segments in the same fashion as described in element 504 above. The animation sequence may then be played back accordingly (508).

Further, the display may be annotated using a dynamic two dimensional (2D) callout for presenting information related to the GGDP objects represented in the display. In the case of a 3D display, the 2D callout may be configured to remain substantially horizontally aligned and perpendicular to the user viewing direction while the 3D display is updated (e.g., re-rendered as the user viewing direction is adjusted) (509). For example, the 2D callout may be configured with an attachment handle coupled to a corresponding GGDP object. The 2D callout may be rotated around the coupling point as the GGDP object is repositioned in the 3D display according to a change in the user viewing angle. The 2D callout may be configured to behave as an object in the 3D display and vary in size as it is viewed at different distances together with the GGDP object while the entire 3D display scene is rotated as the user viewing angle changes.

Still further, the 2D callout may be selectively associated with more than one GGDP object. By doing so, relationships between different perspectives of the GGDP object(s) can be displayed and readily understood. For example, the same GGDP object may have different attributes in a geology perspective versus a drilling perspective. Similarly, the relationship between two different GGDP objects may differ depending on the perspective being viewed. For example, upon a change in perspective from drilling to production, attributes of the GGDP object(s) and the relationship(s) that link the two objects may change.

The 2D callout may incorporate multiple attachment handles each coupled to a corresponding GGDP object. Information regarding each GGDP object may be selectively presented in the 2D callout in various formats such as single line text, multi-line text, text embedded with hyperlinks, an image, a 2D animation, a 3D animation, a graph, a chart, a gauge, statically updated information, dynamically updated information, etc. The current position object may also be annotated with a 2D callout for presenting information relating to the current position information.

Furthermore, as representations of the GGDP objects change their position in the display animation sequence, the coupled 2D callouts may be adjusted in each of their positions to follow the updated locations of the GGDP objects in the 3D display (510).

The method may optionally include determining a rig state based on the real-time drilling data according to a sequential algorithm (511). An example of the algorithm is depicted by the elements shown in FIG. 5.2. FIG. 5.2 includes FIGS. 5.2A and 5.2B for clarity of illustration. The various rig states determined in the example algorithm include:

Slide Drill: This state refers to a sliding operation on the rig, i.e., when a new borehole is drilled without rotating the drill string from the surface, thus, allowing the directional changes from a motor bent housing assembly to take place.

Rotary Drill: This is the most conventional state of drilling whereby a drill string is rotated from the surface.

Trip: Trip refers to operations whereby a drill string is withdrawn from a borehole or inserted into the borehole.

Connection: This is a process in which a new drill pipe is added to the drill string on the surface.

Reaming: This is a process whereby a drill string is rotated with circulation in the existing borehole without creating a new borehole.

Surveys: This is an operation in which a measurement on an inclination and azimuth is obtained at a downhole survey tool.

With the various functionalities described above, the display may then be monitored, analyzed, and used in adjusting the oilfield operation, such as the drilling operation. As the adjustments are made, the process may be repeated. New oilfield data is collected during the oilfield process. The oilfield data may be monitored and new plans generated and compared to the original plan. Further adjustments may be implemented as desired. Accordingly, the oilfield operation may be selectively adjusted based on the display (512).

The elements of the method are depicted in a specific order. However, it will be appreciated that the elements may be performed simultaneously or in a different order or sequence. Further, throughout the method, the oilfield data may be displayed, analyzed, and modified, and the display may accept user inputs that permit users to configure the oilfield data collection, processing, and display procedures.

FIG. 6.1 shows a screen shot of an example display representing a portion of the oilfield operation. The example display includes a navigation window (601), a 3D display window (602), and a 2D display window (603). The navigation window (601) may be used to display a hierarchical tree structure representing the geology, geophysics, drilling, and production (GGDP) related data available for selection to be viewed in the 3D display window (602) and/or the 2D display window (603). Although the screen shot depict three windows arranged in a particular style. More or less windows may be used in visualization techniques for oilfield operations, and the windows may be arranged in many different styles, such as horizontally tiled (as shown), vertically tiled, overlapping, non-overlapping, etc. In the discussion below, the terms referring to various GGDP related data, the GGDP objects, and the representations of the GGDP objects in the display window may be used interchangeably depending the context.

The example navigation window (601) may include a hierarchical folder structure for navigating and selecting a set of time logs, a set of tubular components (BHAs and drill pipes), a set of wellbore geometries (WBGs) with related equipment, and a set of operations reports relating to the borehole. Within a given borehole there may be more than one drilling sections, where each section may recursively include subsections. Time logs, tubular component related data, wellbore geometry related data, and/or operations reports from different sections may be grouped together in subfolders. The structure of the subfolders may reflect the real-world structure of sections and subsections in the borehole. More details of the example navigation window (601) are shown in FIG. 6.2.

Each subfolder of time logs is essentially a table of measurement values keyed by their corresponding time. A current position item associated with the current position object may be created in the hierarchical folder structure to hold and persist the value of the key corresponding to the current row in the table. One of the time logs may be labeled "Depth" and contain the values of the measured depth of the drill bit as a function of time. Typically other time logs may also be selected to aid the user in the analysis of the oilfield operation.

In the example 3D display window (602), representations of a current position object and a number of GGDP objects are included. The current position object is rendered (or represented) as a moving point (or sphere) (604) at a position in the borehole trajectory (608) that is determined by the measured depth at the current time. As new data is received in the time logs, the moving point (604) moves along the borehole trajectory (608) in a real-time animation sequence. A moving 2D callout (606) accompanies this point (604) and displays in textual form the values of the measurements at the current time. The 2D callout (606) is shown to be coupled to the moving point (604) via an attachment handle. The position of the point (604), 2D callout (606), and the contents of the 2D callout (606) are continuously updated as new data is received from a real time data link or as a user manipulates a time player function of the current position object.

In addition, each of the selected drilling equipment is rendered (or represented) as a tube (e.g., the tubular components (605)) along the borehole trajectory (608). The diameter of the tube is shown in proportion to the outer diameter attribute of the tubular component. Since the tubular components form part of a contiguous assembly, the position of the base of each component is at the peak of the previous component in the assembly. The first component (as determined by the order of penetration in the borehole) is the drill bit. This is typically rendered at the bottom of the borehole trajectory, except when the current position object is present in the borehole, in which case the drill bit is rendered at the depth indicated by the current position object. The last component in the assembly is the drill pipe which connects the bottom hole assembly to the wellhead. As new data is received in the time logs, the tubular components (605) move along the borehole trajectory (608) in a real-time animation sequence. A second moving 2D callout (607) is shown coupled to a section of the tubular components (605), which may be used to display a magnified 2D image of a tubular component as well as textual information about the tubular component (e.g., name, type, inner and outer diameter, etc.)

In the example 2D display window (603), the current position object is rendered (or represented) as a horizontal line (611) across the track of a depth indexed vertical chart. A moving 2D callout (612) accompanies this horizontal line (611) and displays, in textual form or as gauges, the values of the measurements at the current time. The position of the horizontal line (611), 2D callout (612), and the contents of the 2D callout (612) are continuously updated as new data is received from the real time data link or as the user manipulates the time player function of the current position object.

Each of the selected drilling equipment is rendered (or represented) as a scaled 2D image (e.g., the BHA (609) and the perforation (610)) in a separate track of the depth indexed vertical chart at a depth that is computed in a similar way as for the 3D display window (602). As new data is received in the time logs, the horizontal line (611) and the BHA (609) move along the vertical depth indexed chart in a real-time animation sequence. A moving 2D callout (not shown) may also be available in an identical or similar format as in the 3D display window (602).

A settings dialog window (613) is also shown in the 2D display window (603). The settings dialog window (613) may be displayed when the user double clicks on the current position item in the hierarchical folder tree in the navigation window (601). The dialog will display the same information as the 2D callouts; however, the position of the dialog is stationary.

After importing time logs into the modeling tool (408), the user can initiate the computation of the rig state based on the sequential algorithm depicted in FIG. 5.2. The computed rig states may be displayed in the 2D display window (603) as a depth-indexed log or a time-indexed log (not shown).

FIG. 6.3 shows an example representation of geology, geophysics, drilling, and production (GGDP) objects in the 3D display window (602). Here, the current position object is rendered (or represented) as a moving sphere (626) along the borehole trajectory (621) penetrating a seismic object (624). Additional seismic objects (622) and (623) are also shown in the 3D display window (602). A 2D callout (625) is shown with two attachment handles coupled to the current position object (626) and the seismic object (624). The 2D callout (625) may be used to present similar information as described above with respect to FIG. 6.1.

Figure 7:
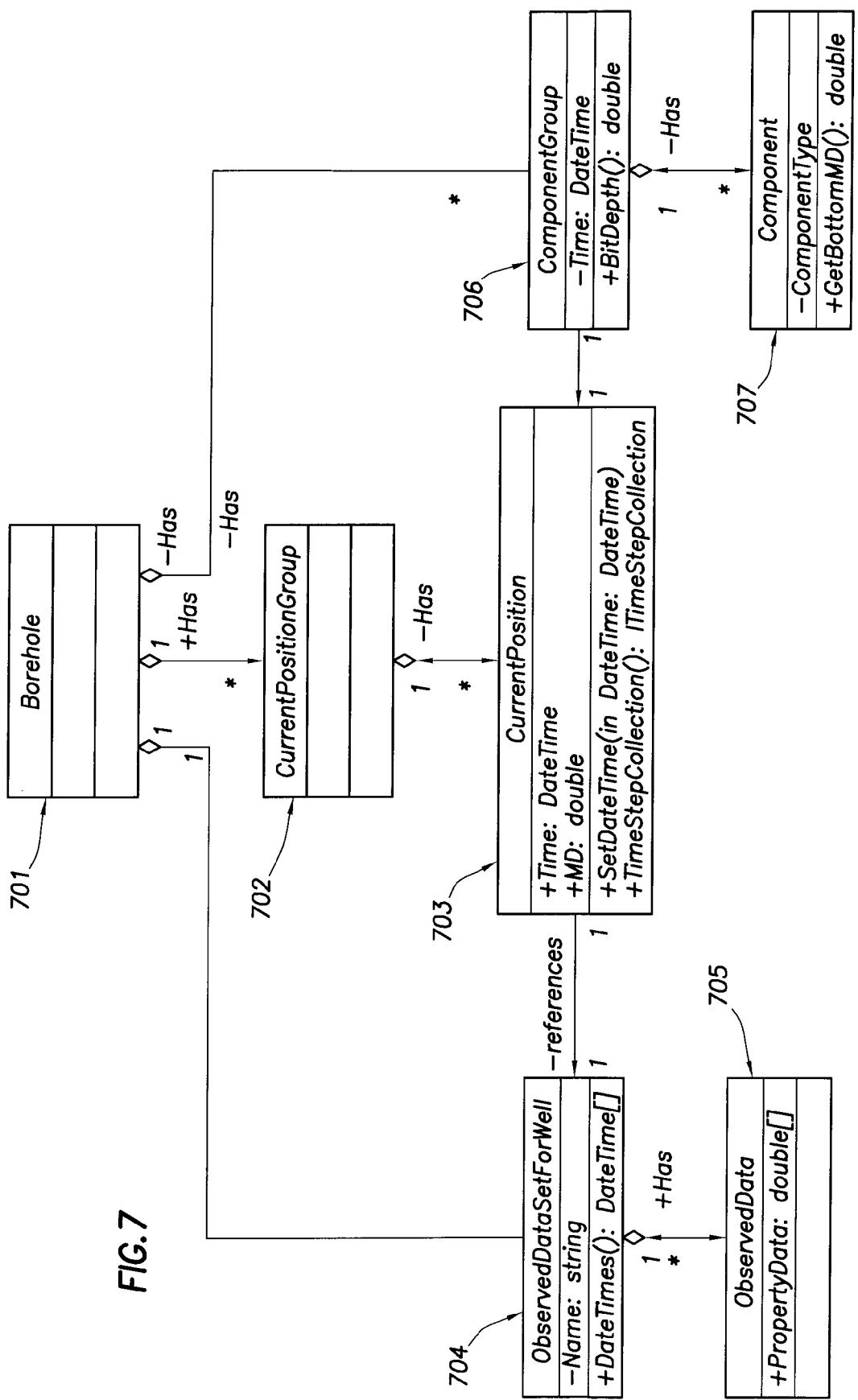
FIG. 7 shows a schematic class diagram of data models representing oilfield objects.

FIG. 7 shows a schematic class diagram representing oilfield object such as the GGDP objects. The class diagram depicts a Borehole object (701), a CurrentPositionGroup object (702), a CurrentPosition object (703), a ComponentGroup object (706), a ComponentObject (707), an ObservedDataSetForWell object (704), and an ObservedData object (705). One skilled in the art will appreciated these objects in the example class diagram may be one of many ways of organizing the GGDP related data in the data repository (434) and/or the computer memory associated with the modeling tool (408) of FIG. 4. The class diagram describes various parent-child relationships and inheritance relationships among the various objects using symbols and conventions known to those skilled in the art.

In this case, the CurrentPositionGroup object may be used to organize the current position information of multiple drill bits in a wellbore or the oilfield. The multiple drill bits may be the results of multiple simulation runs or multiple real-world entities. Relating to a particular drill bit, the current position object (703) includes (i) a data field containing time and measured depth (MD) and (ii) a function field containing a SetDateTime function and a TimeStepCollection function. Tubular components and WBG related data may be organized using the ComponentGroup object (706) and the Component object (707). Various time logs may be organized using the ObservedDataSetForWell object (704) and the ObservedData object (705). Underlying data referenced by these various objects may be stored in folders and/or subfolders in the data repository (434 of FIG. 4) and navigated via the hierarchical folder structure in the navigation window (601 of FIG. 6A) described above.

Using the modeling tool (408 of FIG. 4), a user may select a borehole, connect to a real-time data link, and import selected time logs and/or other GGDP related data. As real-time data is received from the real-time data link and stored in various tables under the corresponding folder/subfolders, the value of the corresponding current position item is updated with the latest time. This may be accomplished in many ways. For example, the CurrentPosition object (703) may be configured to subscribe to monitoring of the time log channels of the ObservedDataSetForWell object (704) using message passing and communication functionalities known to those skilled in the art. The received updates may be used to cause the display of the current position object to change, for example, as the moving point/sphere (604) or (626) described above with respect to FIGS. 6A-6B.

Similarly, tubular component objects represented by the ComponentGroup object (706) may also monitor and react to changes in the corresponding CurrentPosition object (703) and redisplay themselves, for example, as moving tubular components (605) along the borehole trajectory (608) as described above with respect to FIG. 6A.

At any time the user can manipulate a time player function provided by the CurrentPosition object (703). This allows a specified sequence of time segments to be played back as well as to navigate to a particular time segment (prior to or subsequent to the current time position). The specified sequence of time segments and the particular time segment may be retrieved using the TimeStepCollection function of the CurrentPosition object (703). This has the effect of updating the current time of the CurrentPosition object (703) and in turn any tubular component objects that may be linked to the CurrentPosition object (703).

Figure 9:
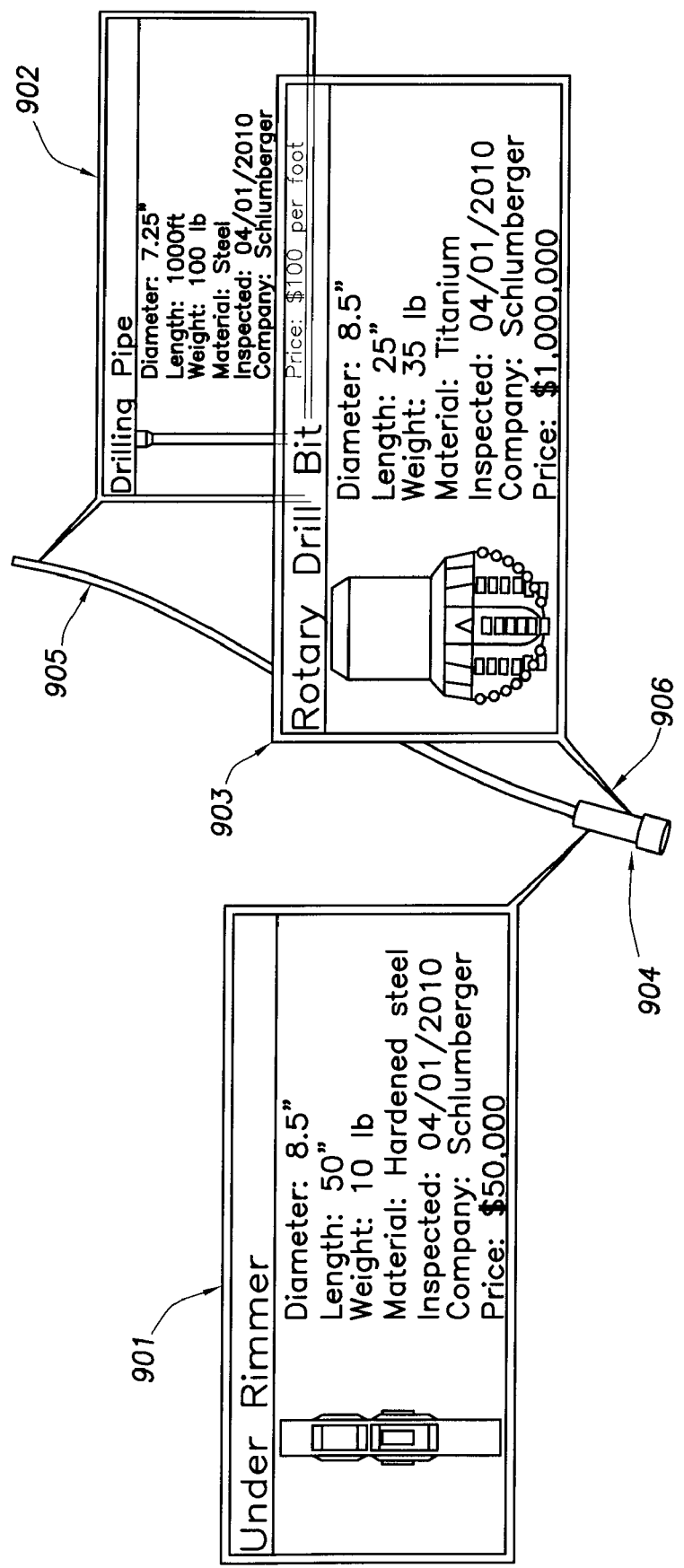

FIGS. 8.1-8.6 and 9 depict displays representing operations of an oilfield. As described above, a 3D view of different GGDP related objects (e.g., earth layers and faults, drilling platform positions, boreholes drilled from platforms, a BHA used to drill boreholes, drilling events and risks encountered while drilling, pipeline routes and etc.) and their relative positions may be viewed on a 3D canvas. While drawing the physical objects of an oilfield operation is relatively straightforward, displaying information that annotate those objects poses some difficulty. Specifically, the 3D objects can be viewed from different viewpoints and under different angles while annotation information is intrinsically two dimensional. When the viewer position changes, the annotation, which initially faced the viewer in a legible format (as depicted in FIG. 8.1), could become barely legible if viewed under even moderate view angles (as depicted in FIG. 8.2). The annotation may maintain a legible format by dynamically repositioning the annotation in the 3D scene to be perpendicular to the viewer direction (as depicted in FIGS. 8.3-8.4). Since the 2D annotation is typically oriented horizontally to be legible, in some cases when the annotated object is viewed at an angle, the dynamic annotation either overlaps the annotated object (as depicted in FIG. 8.5) or becomes disassociated with the annotated object (as depicted in FIG. 8.6) if the annotation offset is increased to avoid overlap. The 2D callouts described with respect to FIGS. 6.1 and 6.2 above avoids legibility and overlap issues described above and, in addition, allow for the incorporation of multi-line text, images, animation, 2D graphs and/or gauges in the annotation as depicted in FIG. 9. The 2D callout (e.g., 901, 902, or 903) may be configured in several ways. In one example, the annotation is treated as a regular object of the 3D scene and the size of the annotation depends on its distance from the viewer. In another example, the size of the annotation is adjusted to maintain a constant screen size.

In the example shown in FIG. 9, the 2D callout (903) may be drawn as a flat polygon (e.g., a rectangle or any other 2D shape) that contains an information area and an attachment handle (906) directed at the annotated object (904). The information area of the callout may contain single and multi-line text (including different fonts, colors, and hyperlinks), images, 2D and 3D animations, as well as static and dynamically-updated graphs, charts, and gauges. The callout is dynamically orientated perpendicular to the user's view direction and horizontally aligned. When the viewer position and view direction change, the callout is rotated around its attachment point to remain horizontal and perpendicular to the view direction. A callout may have different orientations relative to the attachment points. For example, the callout may be positioned to the upper-left, the upper-right, the lower-left, or the lower-right of the annotated object. The callout orientation may be selected either manually by the user or automatically by a software program such that the callout does not obscure the annotated object.

The callout may be treated as a regular object of the 3D scene. In this case the size of the callout depends on its distance from the viewer. In another example, the size of the callout may be dynamically recalculated to maintain a constant size on a computer display. In this example, the recalculation occurs when the viewer position or view direction changes and/or when the callout is re-oriented. Regardless of the size of the callout, the attachment handle is attached to the annotated object. Normally, any 3D object (e.g., (905)) that is positioned between the callout (e.g., (903)) and the viewer may partially or completely obscure the callout (e.g., (903)). However, the user may chose to change the rendering order of the 3D objects (e.g., (905)) to draw the callout (e.g., (903)) in front of any other 3D object (e.g., (905)) on the scene. Combined with maintaining the callout screen size, such a technique would create the impression of a 2D annotation "glued" on top of the 3D scene, where the 2D annotation follows every scene modification.

The callout position in 3D space may not be constant. For example, if the 3D scene is animated and the position of the annotated object (e.g., (904)) and/or the attachment point (e.g., (906)) changes with time, the callout (e.g., (903)) position may also change to follow the movement of the annotated object (e.g., (904)). For example, if a callout (903) annotates the location of a drill bit (904) within the earth, the position of the callout (903) may change to follow the drill bit (904) as the drilling progresses.

FIG. 10 depicts a schematic diagram of a drilling visualization tool for visualizing oilfield objects. FIG. 10 includes FIGS. 10.1-10.4 for clarity of illustration. Here, the oilfield (100) and the modeling tool (408) are essentially the same as discussed with respect to FIGS. 1.3 and 4, respectively. As shown in FIG. 10, wellsite data logging is performed at the oilfield (100). The drilling visualization tool (1000) receives data from a real-time feed (e.g., drilling bit position, drilling parameters, etc.) from the oilfield (100). The real-time feed is imported into and processed by the modeling tool (408) for display as depicted in the displays (1001), (1002), and (1003).

The display (1001) depicts 2D callouts (i.e., Info Bubbles) showing information not only related to drilling (1011.1), but also related to geology/geophysics (1012.1) (e.g., a main seismic horizon (1031.1)), or even a drilling rig (1013.1).

The display (1002) depicts 2D callouts (i.e., Info Bubble) showing information related to the relationship between two objects (e.g., a drilling bit (1021) and a seismic horizon (1022)). In this case, the 2D callout would have two attachment points (1023) and (1024).

The screen shot (1003) depicts changing the user viewing angle and/or position. As depicted here, the image (1031.2) of the main seismic horizon is rotated compared to the image (1031.1) of the main seismic horizon depicted in screen shot (1001). However, the 2D callouts (1011.2), (1012.2), and (1013.2) depicted in display (1003) are oriented towards the view in the same fashion as the 2D callouts (1011.1), (1012.1), and (1013.1) depicted in the display (1001).

Figure 11:
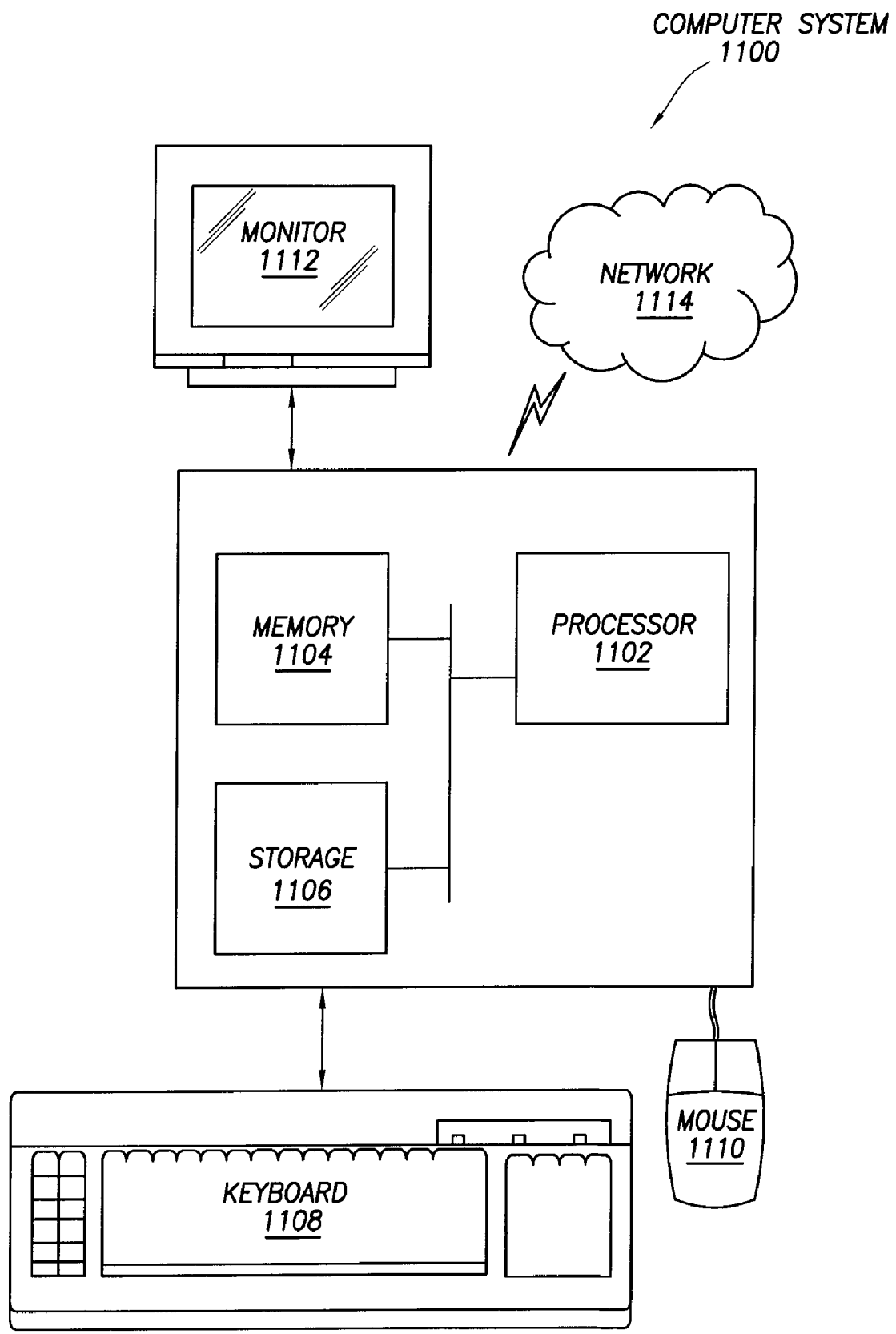
FIG. 11 shows a schematic diagram of a system in accordance with embodiments of visualization techniques of oilfield operations.

Embodiments of the invention may be implemented on virtually any type of computer regardless of the platform being used. For example, as shown in FIG. 11, a computer system (1100) includes one or more processor(s) (1102), associated memory (1104) (e.g., random access memory (RAM), cache memory, flash memory, etc.), a storage device (1106) (e.g., a hard disk, an optical drive such as a compact disk drive or digital video disk (DVD) drive, a flash memory stick, etc.), and numerous other elements and functionalities typical of today's computers (not shown). The computer (1100) may also include input means, such as a keyboard (1108), a mouse (1110), or a microphone (not shown). Further, the computer (1100) may include output means, such as a monitor (1112) (e.g., a liquid crystal display (LCD), a plasma display, or cathode ray tube (CRT) monitor). The computer system (1100) may be connected to a network (1114) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (1100) includes at least the minimal processing, input, and/or output means necessary to practice embodiments of the invention.

Further, those skilled in the art will appreciate that one or more elements of the aforementioned computer system (1100) may be located at a remote location and connected to the other elements over a network. Further, embodiments of the invention may be implemented on a distributed system having a plurality of nodes, where each portion of the invention may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, or any other computer readable storage device.

The systems and methods provided relate to the acquisition of hydrocarbons from an oilfield. It will be appreciated that the same systems and methods may be used for performing subsurface operations, such as mining, water retrieval and acquisition of other underground materials. Further, portions of the systems and methods may be implemented as software, hardware, firmware, or combinations thereof.

It will be understood from the foregoing description that various modifications and changes may be made in embodiments of the visualization techniques for oilfield operations without departing from its true spirit. For example, the method may be performed in a different sequence, and the components provided may be integrated or separate.

This description is intended for purposes of illustration only and should not be construed in a limiting sense. The scope of the visualization techniques for oilfield operations should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of visualizing oilfield data for an oilfield operation, comprising:
   obtaining the oilfield data, at least a first portion of the oilfield data being real-time data generated from a borehole of an oilfield at a plurality of time segments;
   generating a current position object comprising current position information of an oilfield object in the borehole;
   updating the current position object responsive to receiving the real-time data at one or more of the plurality of time segments;
   displaying a representation of a first geology, geophysics, drilling, and production object in a three dimensional (3D) display based on a second portion of the oilfield data;
   annotating the representation of the first geology, geophysics, drilling, and production object using a two dimensional (2D) callout, the 2D callout comprising an attachment handle coupled to the representation of the first geology, geophysics, drilling, and production object in the 3D display;
   updating the 3D display in an animation sequence in real-time, responsive to updating the current position object, by displaying the representation of the first geology, geophysics, drilling, and production object at an updated location and adjusting a position of the 2D callout in the 3D display according to the updated location;
   updating the 3D display responsive to a change in a user viewing direction,
      wherein the 2D callout remains coupled to the representation of the first geology, geophysics, drilling, and production object, and
      wherein the 2D callout remains substantially horizontally aligned and perpendicular to the user viewing direction;
   displaying a representation of a second geology, geophysics, drilling, and production object in the 3D display; and
   expanding the 2D callout to further comprise a second attachment handle coupled to the representation of the second geology, geophysics, drilling, and production object based on a user selection
   wherein the 2D callout comprises information relating to at least one selected from a group consisting of the first geology, geophysics, drilling, and production object and the second geology, geophysics, drilling, and production object based on the user selection.

2. The method of claim 1, wherein the real-time data comprises at least one selected from a group consisting of a bit depth, a hook load, a weight on bit, and a mud density.

3. The method of claim 1, wherein the first geology, geophysics, drilling, and production object comprising at least one selected from a group consisting of an earth layer, a fault, a drilling platform, a borehole, a bottom-hole assembly, a drill pipe, a tubular component, a casing, a tubing string, a perforation, a packer, a pump, a valve, a drilling event, a risk, and a pipeline route.

4. The method of claim 1, wherein the 2D callout comprises at least one selected from a group consisting of text, an image, a hyperlink, a 2D animation, a 3D animation, a graph, a chart, a gauge, statically updated information, and dynamically updated information.

5. A computer readable medium storing instructions for visualizing oilfield data for an oilfield operation, the instructions comprising functionality for:
   obtaining the oilfield data, at least a first portion of the oilfield data being real-time data generated from a borehole of an oilfield at a plurality of time segments;
   generating a current position object comprising current position information of an oilfield object in the borehole;
   updating the current position object responsive to receiving the real-time data at one or more of the plurality of time segments;
   displaying a representation of a first geology, geophysics, drilling, and production object in a three dimensional (3D) display based on a second portion of the oilfield data;
   annotating the representation of the first geology, geophysics, drilling, and production object using a two dimensional (2D) callout, the 2D callout comprising a first attachment handle coupled to the representation of the first geology, geophysics, drilling, and production object in the 3D display;
   updating the 3D display in an animation sequence in real-time, responsive to updating the current position object, by displaying the representation of the first geology, geophysics, drilling, and production object at an updated location and adjusting a position of the 2D callout in the 3D display according to the updated location;
   updating the 3D display responsive to a change in a user viewing direction,
      wherein the 2D callout remains coupled to the representation of the first geology, geophysics, drilling, and production object, and
      wherein the 2D callout remains substantially horizontally aligned and perpendicular to the user viewing direction;
   displaying a representation of a second geology, geophysics, drilling, and production object in the 3D display; and
   expanding the 2D callout to further comprise a second attachment handle coupled to the representation of the second geology, geophysics, drilling, and production object based on a user selection,
   wherein the 2D callout comprises information relating to at least one selected from a group consisting of the first geology, geophysics, drilling, and production object and the second geology, geophysics, drilling, and production object based on the user selection.

6. The computer readable medium of claim 5, wherein the first geology, geophysics, drilling, and production object comprising at least one selected from a group consisting of an earth layer, a fault, a drilling platform, a borehole, a bottom-hole assembly, a drill pipe, a tubular component, a casing, a tubing string, a perforation, a packer, a pump, a valve, a drilling event, a risk, and a pipeline route.

7. The computer readable medium of claim 5, wherein the instructions further comprise functionality for:
   displaying the representation of the first geology, geophysics, drilling, and production object at an updated location responsive to real-time data; and
   adjusting the 2D callout to follow the updated location.

8. The computer readable medium of claim 5, wherein the 2D callout comprises at least one selected from a group consisting of text, an image, a hyperlink, a 2D animation, a 3D animation, a graph, a chart, a gauge, statically updated information, and dynamically updated information.

9. A system for visualizing oilfield data for an oilfield operation, comprising:
   a surface unit for collecting oilfield data; and
   a modeling tool operatively linked to the surface unit, the modeling tool comprising functionality for:
      obtaining the oilfield data, at least a first portion of the oilfield data being real-time data generated from a borehole of the oilfield at a plurality of time segments;
      generating a current position object comprising current position information of an oilfield object in the borehole;
      updating the current position object responsive to receiving the real-time data at one or more of the plurality of time segments;
      displaying a representation of a first geology, geophysics, drilling, and production object in a three dimensional (3D) display based on a second portion of the oilfield data;
      annotating the representation of the first geology, geophysics, drilling, and production object using a two dimensional (2D) callout, the 2D callout comprising an attachment handle coupled to the representation of the first geology, geophysics, drilling, and production object in the 3D display;
   updating the 3D display in an animation sequence in real-time, responsive to updating the current position object, by displaying the representation of the first geology, geophysics, drilling, and production object at an updated location and adjusting a position of the 2D callout in the 3D display according to the updated location;
   updating the 3D display responsive to a change in a user viewing direction,
      wherein the 2D callout remains coupled to the representation of the first geology, geophysics, drilling, and production object, and
      wherein the 2D callout remains substantially horizontally aligned and perpendicular to the user viewing direction;
   displaying a representation of a second geology, geophysics, drilling, and production object in the 3D display; and
   expanding the 2D callout to further comprise a second attachment handle coupled to the representation of the second geology, geophysics, drilling, and production object based on a user selection,
   wherein the 2D callout comprises information relating to at least one selected from a group consisting of the first geology, geophysics, drilling, and production object and the second geology, geophysics, drilling, and production object based on the user selection.

10. The system of claim 9, the modeling tool further comprising functionality for:
    storing one or more of the plurality of time segments to generate a collection of time segments;
    updating the current position object based on a time segment selected from the collection of time segments; and
    playing back the animation sequence starting from the time segment responsive to updating the current position object.

11. The system of claim 9, the modeling tool further comprising functionality for:
    representing the current position object as a pre-determined shape in the animation sequence.

12. The system of claim 9, wherein the real-time data comprises at least one selected from a group consisting of a bit depth, a hook load, a weight on bit, and a mud density.

13. The system of claim 9, wherein the animation sequence comprises a representation of a first geology, geophysics, drilling, and production object, the geology, geophysics, drilling, and production object comprising at least one selected from a group consisting of an earth layer, a fault, a drilling platform, a borehole, a bottom-hole assembly, a drill pipe, a tubular component, a casing, a tubing string, a perforation, a packer, a pump, a valve, a drilling event, a risk, and a pipeline route.

14. The system of claim 9, the modeling tool further comprising functionality for:
    determining a rig state for the oilfield operation based on the real-time data according to a sequential algorithm.

15. The system of claim 9, wherein the 2D callout comprises at least one selected from a group consisting of text, an image, a hyperlink, a 2D animation, a 3D animation, a graph, a chart, a gauge, statically updated information, and dynamically updated information.

* * * * *